US012298932B2

(12) United States Patent
Sharif et al.

(10) Patent No.: US 12,298,932 B2
(45) Date of Patent: May 13, 2025

(54) LOAD BALANCING SYSTEM FOR THE EXECUTION OF APPLICATIONS ON RECONFIGURABLE PROCESSORS

(71) Applicant: SambaNova Systems, Inc., Palo Alto, CA (US)

(72) Inventors: Milad Sharif, Palo Alto, CA (US); Ravinder Kumar, Fremont, CA (US); Qi Zheng, Fremont, CA (US); Neal Sanghvi, Palo Alto, CA (US); Jiayu Bai, Palo Alto, CA (US); Arnav Goel, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/200,311

(22) Filed: May 22, 2023

(65) Prior Publication Data

US 2023/0388373 A1  Nov. 30, 2023

Related U.S. Application Data

(60) Provisional application No. 63/345,775, filed on May 25, 2022.

(51) Int. Cl.
 *G06F 15/78* (2006.01)
 *G06F 9/28* (2006.01)
 (Continued)

(52) U.S. Cl.
 CPC .... *G06F 15/7871* (2013.01); *G06F 15/17343* (2013.01); *G06F 15/7867* (2013.01);
 (Continued)

(58) Field of Classification Search
 None
 See application file for complete search history.

(56) References Cited

U.S. PATENT DOCUMENTS 4,344,134 A * 8/1982 Barnes ............... G06F 15/8007
 712/16
5,175,865 A * 12/1992 Hillis ............... G06F 15/17343
 712/13
(Continued)

FOREIGN PATENT DOCUMENTS

WO    2010142987 A1    12/2010

OTHER PUBLICATIONS

Garcia et al. "A Load Balancing Technique for Some Coarse-Grained Multicomputer Algorithms", 21st International Conference on Computers and Their Applications (Year: 2006).*
(Continued)

*Primary Examiner* — Shirley X Zhang
(74) *Attorney, Agent, or Firm* — Flagship Patents; Sikander M. Khan; Joachim Erhard Pistorius

(57) ABSTRACT

A data processing system is presented in a client-server configuration for executing first and second applications that a client in the client-server configuration can offload for execution onto the data processing system. The data processing system includes a server and a pool of reconfigurable data flow resources that is configured to execute the first application in a first runtime context and the second application in a second runtime context. The server is configured to establish a session with the client, receive first and second execution requests for executing the first application and the second application from the client, start respective first and second execution of the first and second applications in the respective first and second runtime contexts in response to receiving the first and second execution requests, and balance a first load from the first execution with a second load from the second execution.

18 Claims, 15 Drawing Sheets

(51) Int. Cl.
*G06F 9/38* (2018.01)
*G06F 15/173* (2006.01)
*G06F 15/80* (2006.01)

(52) U.S. Cl.
CPC .......... *G06F 15/7889* (2013.01); *G06F 15/80* (2013.01); *G06F 9/28* (2013.01); *G06F 9/3885* (2013.01)

(56) References Cited

U.S. PATENT DOCUMENTS

| | | | | |
|---|---|---|---|---|
| 6,145,072 | A * | 11/2000 | Shams | G06F 15/17343 710/2 |
| 11,425,195 | B1 * | 8/2022 | Matthews | G06N 3/063 |
| 11,915,041 | B1 * | 2/2024 | Tanach | G06F 9/4881 |
| 2019/0042518 | A1 * | 2/2019 | Marolia | G06F 13/4221 |
| 2020/0004567 | A1 * | 1/2020 | Cinos | G06F 9/45516 |
| 2020/0142753 | A1 * | 5/2020 | Harwood | G06F 9/4856 |
| 2020/0310994 | A1 * | 10/2020 | ChoFleming | G06F 15/8007 |
| 2021/0055964 | A1 * | 2/2021 | Brewer | G06F 9/546 |
| 2022/0164297 | A1 * | 5/2022 | Sity | G06F 12/0802 |
| 2022/0300817 | A1 * | 9/2022 | Oh | G06F 9/3834 |
| 2023/0109990 | A1 * | 4/2023 | Pappu | G06T 1/20 345/501 |

OTHER PUBLICATIONS

Koeplinger et al., Spatial: A Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

LOAD BALANCING SYSTEM FOR THE EXECUTION OF APPLICATIONS ON RECONFIGURABLE PROCESSORS

RELATED APPLICATIONS AND DOCUMENTS

This application claims the benefit of U.S. Provisional Patent Application No. 63/345,775, entitled, "A Load Balancing System for the Execution of Applications on Reconfigurable Processors" filed on 25 May 2022. The provisional application is hereby incorporated by reference for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239,252, now U.S. Pat. No. 10,698,853 B1, filed Jan. 3, 2019, entitled "VIRTUALIZATION OF A RECONFIGURABLE DATA PROCESSOR;"

U.S. Nonprovisional patent application Ser. No. 16/862,445, now U.S. Pat. No. 11,188,497 B2, filed Apr. 29, 2020, entitled "VIRTUALIZATION OF A RECONFIGURABLE DATA PROCESSOR;"

U.S. Nonprovisional patent application Ser. No. 16/197,826, now U.S. Pat. No. 10,831,507 B2, filed Nov. 21, 2018, entitled "CONFIGURATION LOAD OF A RECONFIGURABLE DATA PROCESSOR;"

U.S. Nonprovisional patent application Ser. No. 16/198,086, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 17/093,543, filed Nov. 9, 2020, entitled "EFFICIENT CONFIGURATION OF A RECONFIGURABLE DATA PROCESSOR;"

U.S. Nonprovisional patent application Ser. No. 16/260,548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"

U.S. Nonprovisional patent application Ser. No. 16/536,192, now U.S. Pat. No. 11,080,227 B2, filed Aug. 8, 2019, entitled "COMPILER FLOW LOGIC FOR RECONFIGURABLE ARCHITECTURES;"

U.S. Nonprovisional patent application Ser. No. 17/326,128, filed May 20, 2021, entitled "COMPILER FLOW LOGIC FOR RECONFIGURABLE ARCHITECTURES;"

U.S. Nonprovisional patent application Ser. No. 16/407,675, now U.S. Pat. No. 11,386,038 B2, filed May 9, 2019, entitled "CONTROL FLOW BARRIER AND RECONFIGURABLE DATA PROCESSOR;"

U.S. Nonprovisional patent application Ser. No. 16/504,627, now U.S. Pat. No. 11,055,141 B2, filed Jul. 8, 2019, entitled "QUIESCE RECONFIGURABLE DATA PROCESSOR;"

U.S. Nonprovisional patent application Ser. No. 17/322,697, filed May 17, 2021, entitled "QUIESCE RECONFIGURABLE DATA PROCESSOR;"

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744,077, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688,069, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718,094, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 16/560,057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"

U.S. Nonprovisional patent application Ser. No. 16/572,527, now U.S. Pat. No. 11,410,027 B2, filed Sep. 16, 2019, entitled "Performance Estimation-Based Resource Allocation for Reconfigurable Architectures;"

U.S. Nonprovisional patent application Ser. No. 15/930,381, now U.S. Pat. No. 11,250,105 B2, filed May 12, 2020, entitled "COMPUTATIONALLY EFFICIENT GENERAL MATRIX-MATRIX MULTIPLICATION (GEMM);"

U.S. Nonprovisional patent application Ser. No. 17/337,080, now U.S. Pat. No. 11,328,209 B1, filed Jun. 2, 2021, entitled "MEMORY EFFICIENT DROPOUT;"

U.S. Nonprovisional patent application Ser. No. 17/337,126, now U.S. Pat. No. 11,256,987 B1, filed Jun. 2, 2021, entitled "MEMORY EFFICIENT DROPOUT, WITH REORDERING OF DROPOUT MASK ELEMENTS;"

U.S. Nonprovisional patent application Ser. No. 16/890,841, filed Jun. 2, 2020, entitled "ANTI-CONGESTION FLOW CONTROL FOR RECONFIGURABLE PROCESSORS;"

U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION;"

U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371, 049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922, 975, filed Jul. 7, 2020, entitled "RUNTIME VIRTUALIZATION OF RECONFIGURABLE DATA FLOW RESOURCES;"

U.S. Nonprovisional patent application Ser. No. 16/996, 666, filed Aug. 18, 2020, entitled "RUNTIME PATCHING OF CONFIGURATION FILES;"

U.S. Nonprovisional patent application Ser. No. 17/214, 768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127, 818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127, 929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185, 264, filed Feb. 25, 2021, entitled "TIME-MULTIPLEXED USE OF RECONFIGURABLE HARDWARE;"

U.S. Nonprovisional patent application Ser. No. 17/216, 647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216, 650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216, 657, now U.S. Pat. No. 11,263,170 B1, filed Mar. 29, 2021, entitled "LOSSLESS TILING IN CONVOLUTION NETWORKS—PADDING BEFORE TILING, LOCATION-BASED TILING, AND ZEROING-OUT;"

U.S. Nonprovisional patent application Ser. No. 17/384, 515, filed Jul. 23, 2021, entitled "LOSSLESS TILING IN CONVOLUTION NETWORKS—MATERIALIZATION OF TENSORS;"

U.S. Nonprovisional patent application Ser. No. 17/216, 651, now U.S. Pat. No. 11,195,080 B1, filed Mar. 29, 2021, entitled "LOSSLESS TILING IN CONVOLUTION NETWORKS—TILING CONFIGURATION;"

U.S. Nonprovisional patent application Ser. No. 17/216, 652, now U.S. Pat. No. 11,227,207 B1, filed Mar. 29, 2021, entitled "LOSSLESS TILING IN CONVOLUTION NETWORKS—SECTION BOUNDARIES;"

U.S. Nonprovisional patent application Ser. No. 17/216, 654, now U.S. Pat. No. 11,250,061 B1, filed Mar. 29, 2021, entitled "LOSSLESS TILING IN CONVOLUTION NETWORKS—READ-MODIFY-WRITE IN BACKWARD PASS;"

U.S. Nonprovisional patent application Ser. No. 17/216, 655, now U.S. Pat. No. 11,232,360 B1, filed Mar. 29, 2021, entitled "LOSSLESS TILING IN CONVOLUTION NETWORKS—WEIGHT GRADIENT CALCULATION;"

U.S. Nonprovisional patent application Ser. No. 17/364, 110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364, 129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364, 141, filed Jun. 30, 2021, entitled "LOSSLESS TILING IN CONVOLUTION NETWORKS—PADDING AND RE-TILLING AT SECTION BOUNDARIES;"

U.S. Nonprovisional patent application Ser. No. 17/384, 507, filed Jul. 23, 2021, entitled "LOSSLESS TILING IN CONVOLUTION NETWORKS—BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397, 241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216, 509, now U.S. Pat. No. 11,191,182 B1, filed Mar. 29, 2021, entitled "UNIVERSAL RAIL KIT;"

U.S. Nonprovisional patent application Ser. No. 17/379, 921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379, 924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378, 342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378, 391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a system, and more particularly, to a data processing system with a pool of reconfigurable data flow resources and a load balancing system. The load balancing system is part of a server in the data processing system that is part of a client-server configuration for executing applications that a client in the client-server configuration can offload for execution onto the data processing system. Thereby, the load balancing system balances the loads from executing the applications on the pool of reconfigurable data flow resources.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, often include specialized hardware elements such as computing resources and device memory that operate in conjunction with one or more software elements such as a CPU and attached host memory in deep learning applications.

Deep learning is a subset of machine learning algorithms that are inspired by the structure and function of the human brain. Most deep learning algorithms involve artificial neural network architectures, in which multiple layers of neurons each receive input from neurons in a prior layer or layers, and in turn influence the neurons in the subsequent layer or layers.

Training a neural network involves determining weights that are associated with the neural network, and making inference involves using a trained neural network to compute results by processing input data based on weights associated with the trained neural network.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
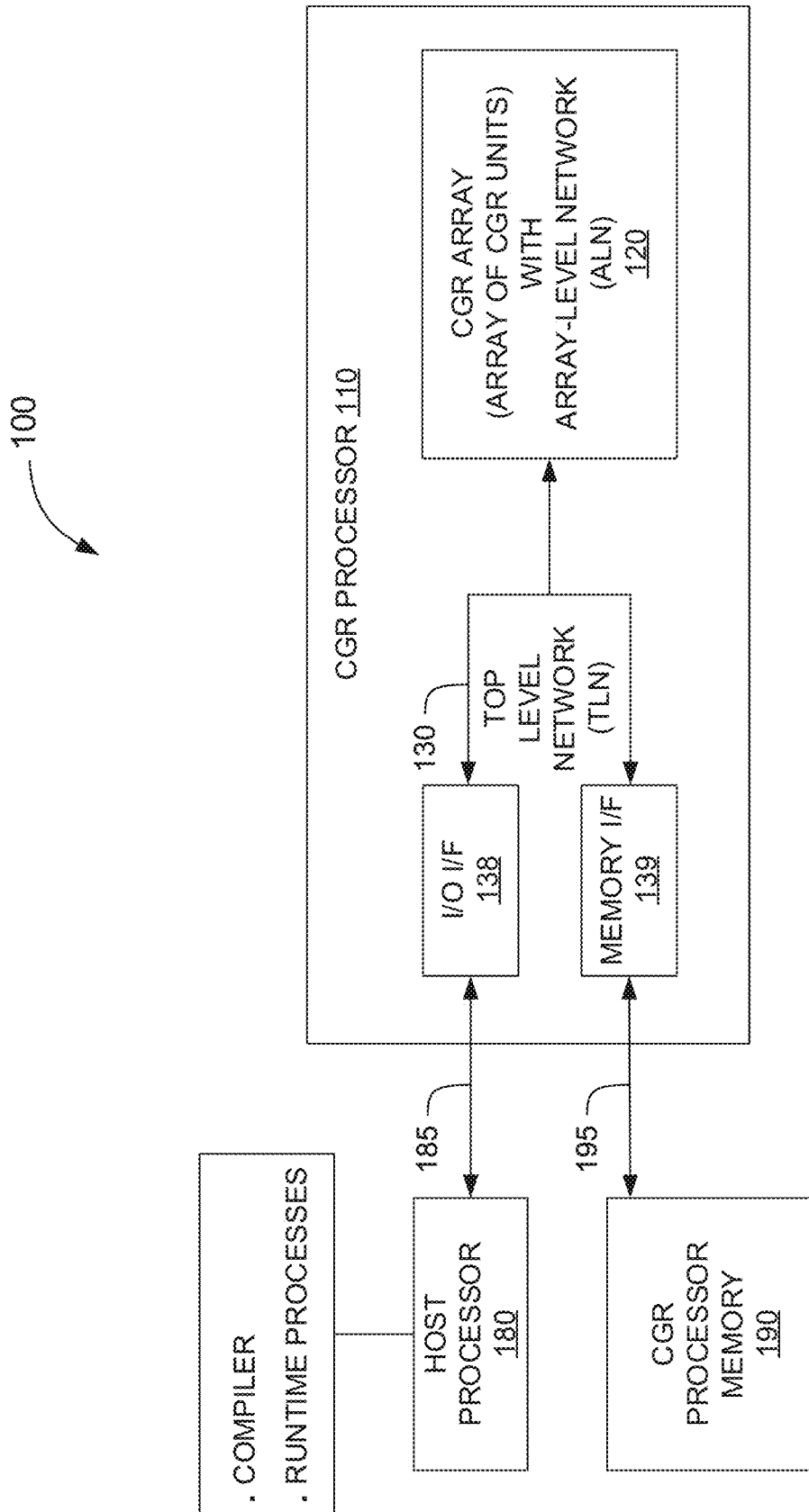
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

Traditional high-performance computing (HPC) applications often involve complex calculations and data processing that are executed at high speeds. Examples for HPC applications include serialized compute-hungry scientific simulations. HPC applications often run on an array of supercomputer nodes or clusters.

Some applications may include HPC tasks as well as machine learning (ML) computation tasks, and an illustrative hybrid workflow may intertwine the execution of HPC tasks and ML computation tasks.

Applications for machine learning (ML) and artificial intelligence (AI) may require massively parallel computations, where many parallel and interdependent threads (meta-pipelines) exchange data, and training these neural network models can be computationally extremely demanding. The computations involved in neural network training often include lengthy sequences that are highly repetitive, and that do not depend on the internal results from other instances of the sequence. Such computations often can be parallelized by running different instances of the sequence on different machines. Typically, the algorithms share partial results periodically among the instances, so periodic sync-ups occur as the algorithm proceeds.

Mechanisms for parallelizing neural network training can be divided roughly into two groups: model parallelism and data parallelism. In practice, parallelization mechanisms are sometimes mixed and matched, using a combination of model parallelism and data parallelism.

With model parallelism, the network model is divided up and parts of it are allocated to different data processing systems, which are sometimes also referred to as "nodes", "worker nodes", or "machines". In some versions the model is divided longitudinally, such that upstream portions of the model are executed by one data processing system, which passes its results to another data processing system that executes downstream portions of the model. In the meantime, the upstream data processing system can begin processing the next batch of training data through the upstream portions of the model. In other versions of model parallelism, the model may include branches which are later merged downstream. In such versions the different branches could be processed on different data processing systems.

With data parallelism, different instances of the same network model are programmed into different data processing systems. The different instances typically each process different batches of the training data, and the partial results are combined.

Thus, applications for machine learning (ML) and artificial intelligence (AI) are ill-suited for execution on Von Neumann computers including supercomputer nodes or clusters. They require architectures that are adapted for parallel processing, such as coarse-grained reconfigurable architectures (CGRAs) or graphic processing units (GPUs).

Reconfigurable processors, and especially CGRAs, often include specialized hardware elements such as computing and memory units that operate in conjunction with one or more software elements such as a host processor and attached host memory, and are particularly efficient for implementing and executing highly-parallel applications such as machine learning applications. Therefore, it is desirable to provide a new data processing system that is particularly suited for executing highly-parallel applications.

The new data processing system should be available for receiving and executing such applications in cooperation with other systems. The new data processing system should provide for a flexible use of reconfigurable data-flow resources and leverage artificial intelligence (AI) to improve the execution of compute intensive applications such as machine-learning (ML) and training of neural networks. The new data processing system should be flexible to handle several highly-parallel applications at once while being able to provide sufficient progress to the execution of each one of these applications. The new data processing system should also provide for an integration with other systems in a new heterogeneous system having heterogeneous node types. Such a heterogeneous system should enable the execution of different types of a calculation on the desirable and efficient compute resource, thereby allowing each application to execute on the right mix of node types for its computational needs.

FIG. 1 illustrates an example data processing system 100 including a host processor 180, a reconfigurable processor such as a coarse-grained reconfigurable (CGR) processor 110, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via data bus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. A high-level program is source code written in programming languages like Spatial, Python, C++, and C. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

If desired, the high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

The architecture, configurability, and data flow capabilities of CGR array 120 enables increased compute power that supports both parallel and pipelined computation. CGR processor 110, which includes CGR arrays 120, can be programmed to simultaneously execute multiple independent and interdependent data flow graphs. To enable simultaneous execution, the data flow graphs may be distilled from a high-level program and translated to a configuration file for the CGR processor 110. In some implementations, execution of the data flow graphs may involve using more than one CGR processor 110.

Host processor 180 may be, or include, a computer such as further described with reference to FIG. 2. Host processor 180 runs runtime processes, as further referenced herein. Therefore, host processor 180 or portions of host processor 180 are sometimes also referred to as a runtime processor. A runtime context as further referenced herein relates to the execution of the data flow graphs on CGR processor 110 together with the execution of the associated runtime processes by host processor 180.

If desired, host processor 180 may implement a server in a client-server configuration. For example, the host processor 180 may manage resources and services that the clients request. Such services may include the establishment of communication channels with the clients, the reception of execution tasks from the clients, managing the execution tasks on the CGR processor 110, and/or the balancing of loads associated with the execution of the tasks on the CGR processor 110.

Figure 6:
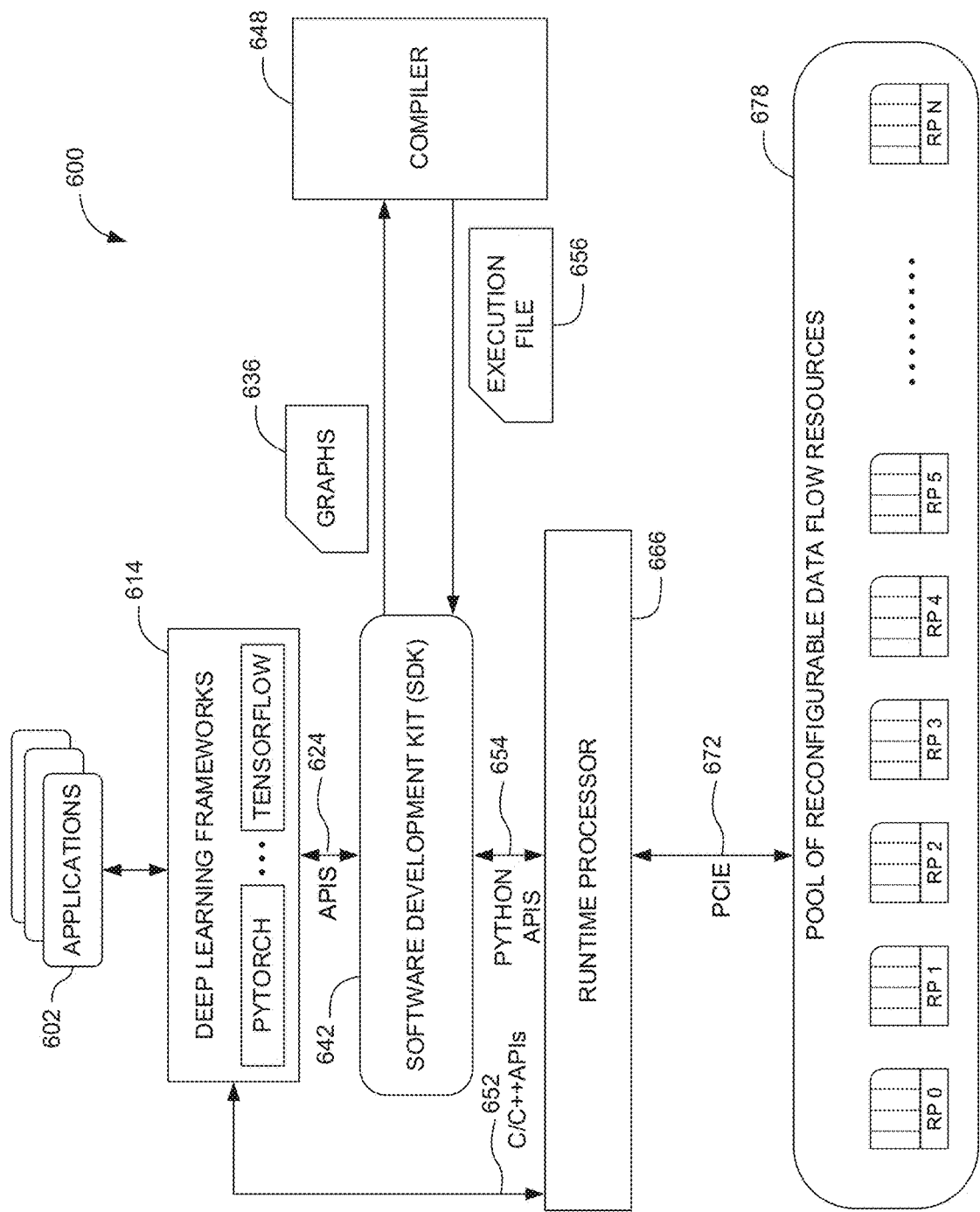
FIG. 6 is a diagram of an illustrative compute environment in which applications are provided a unified interface to a pool of reconfigurable data flow resources such that the pool of reconfigurable data flow resources is available to the applications as a single reconfigurable processor.

In some implementations, host processor 180 may also be used to run computer programs, such as the compiler further described herein with reference to FIG. 6. In some implementations, the compiler may run on a computer that is similar to the computer described with reference to FIG. 2, but separate from host processor 180.

The compiler may perform the translation of high-level programs to executable bit files. While traditional compilers sequentially map operations to processor instructions, typically without regard to pipeline utilization and duration (a task usually handled by the hardware), an array of CGR units 120 requires mapping operations to processor instructions in both space (for parallelism) and time (for synchronization of interdependent computation graphs or data flow graphs). This requirement implies that a compiler for the CGR array 120 decides which operation of a computation graph or data flow graph is assigned to which of the CGR units in the CGR array 120, and how both data and, related to the support of data flow graphs, control information flows among CGR units, and to and from host processor 180 and attached CGR processor memory 190.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file. In some implementations described herein, a CGR array 120 is configured by programming one or more configuration stores with all or parts of the configuration file. Therefore, the configuration file is sometimes also referred to as a programming file.

A single configuration store may be at the level of the CGR processor 110 or the CGR array 120, or a CGR unit may include an individual configuration store. The configuration file may include configuration data for the CGR array and CGR units in the CGR array, and link the computation graph to the CGR array. Execution of the configuration file by CGR processor 110 causes the CGR array (s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
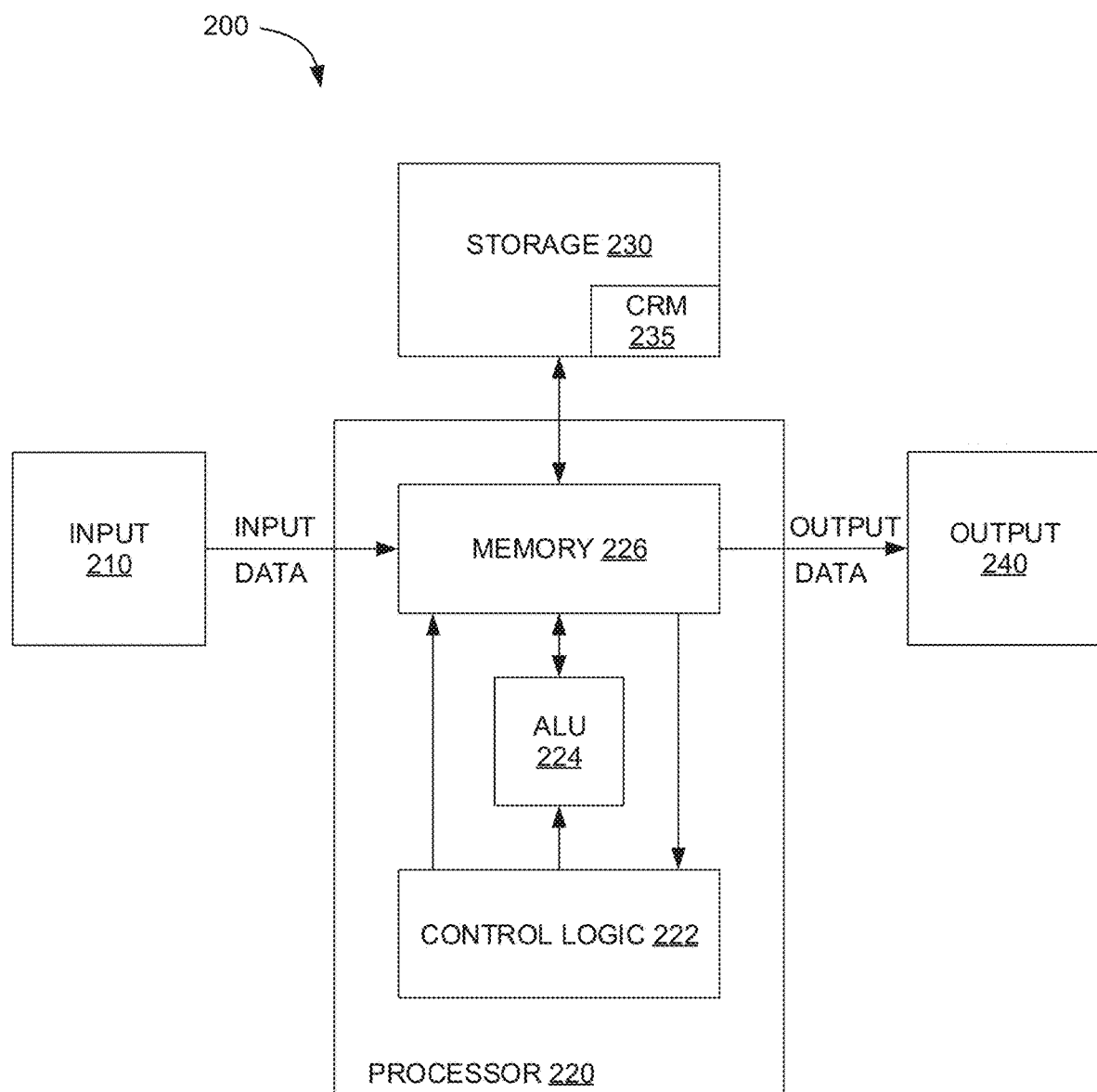
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220, to provide input data. If desired, memory 226 of processor 220 may store the input data. Processor 220 is coupled with output device 240. In some implementations, memory 226 may provide output data to output device 240.

Processor 220 further includes control logic 222 and arithmetic and logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM 235), such as used for storing computer programs. The storage device 230 is sometimes also referred to as host memory.

Figure 3:
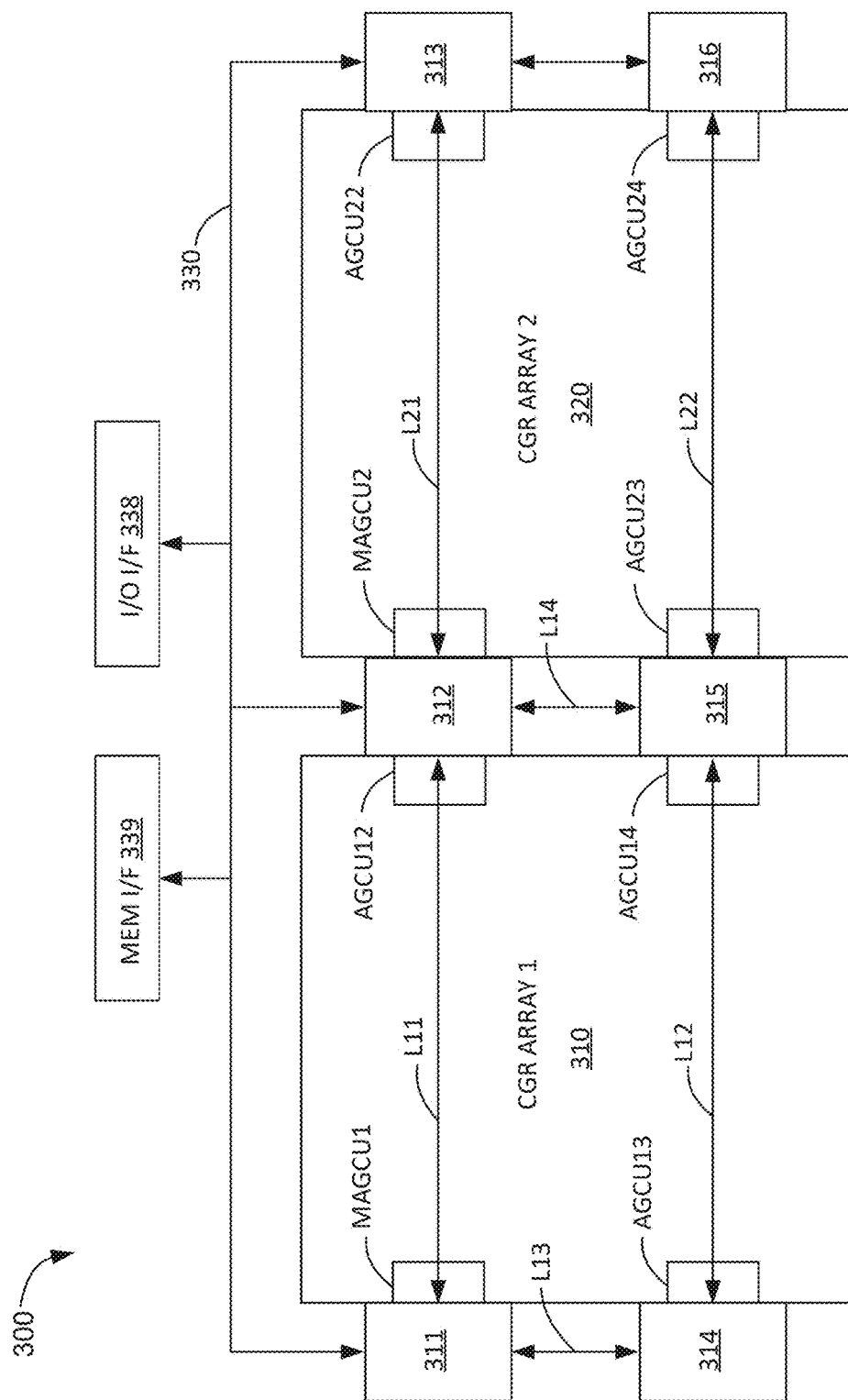
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
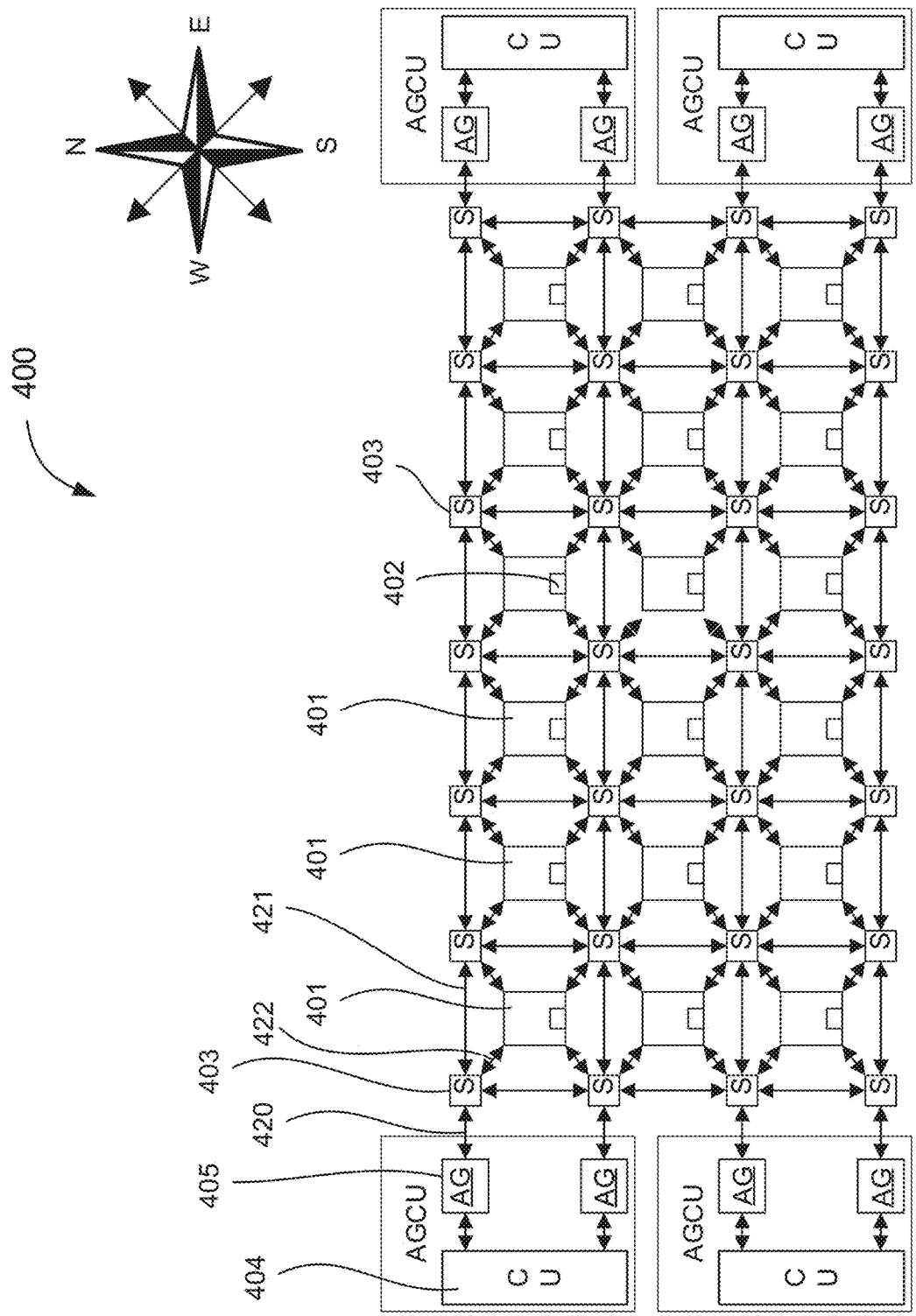
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada.

Illustratively, each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes, which is sometimes also referred to as "runtime logic") may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance using one of the interconnects 422. Two switch units 403 in each CGR array quadrant have links to an AGCU using interconnects 420. The coalescing unit 404 of the AGCU arbitrates between the address generators 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more interconnects 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
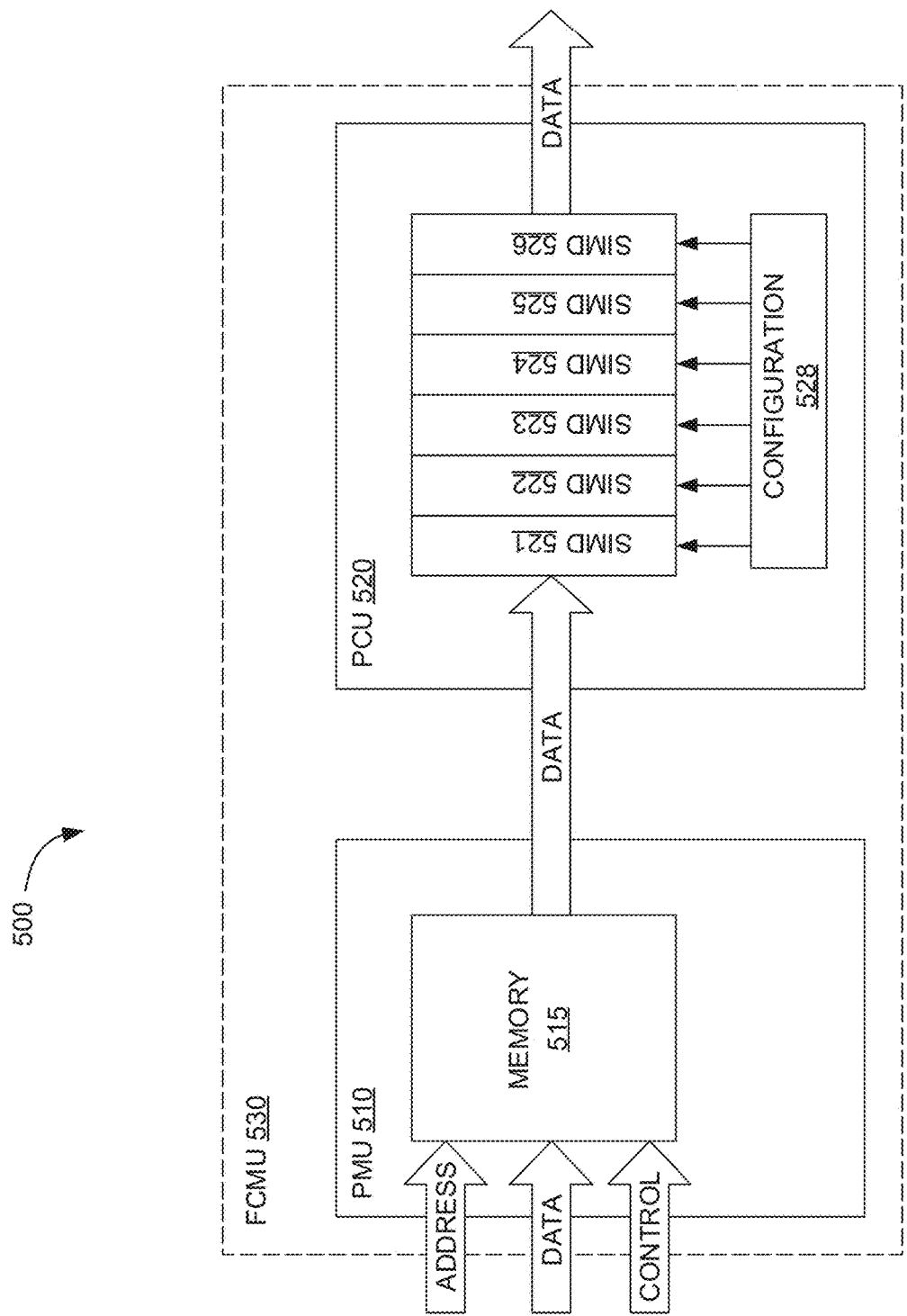
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (e.g., write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

FIG. 6 shows a compute environment 600 that provides on-demand network access to a pool of reconfigurable data flow resources 678 that can be rapidly provisioned and released with minimal management effort or service provider interaction. The pool of reconfigurable data flow resources 678 includes CGR processor memory (e.g., attached CGR processor memory 190 of FIG. 1), arrays of CGR units (e.g., CGR arrays 120 of FIG. 1), and busses (e.g., memory bus 195 of FIG. 1 and/or TLN 330 of FIG. 3) that couple the arrays of CGR units and the CGR processor memory.

The busses or transfer resources enable the arrays of CGR units to receive and send data. Examples of the busses include peripheral component interface express (PCIe) channels, direct memory access (DMA) channels, double data-rate (DDR) channels, Ethernet channels, and Infini-Band channels.

The arrays of CGR units (e.g., arrays of compute units and memory units) are arranged in one or more reconfigurable processors (e.g., CGR processor 110 of FIG. 1) and may be coupled with each other in a programmable interconnect fabric (e.g., ALN 120 of FIG. 1). In some implementations, the arrays of CGR units are aggregated as a uniform pool of resources that are assigned to the execution of user applications.

The CGR processor memory of the pool of reconfigurable data flow resources 678 may be usable by the arrays of CGR units to store data. Examples of the CGR processor memory include main memory (e.g., off-chip/external dynamic random-access memory (DRAM)) and/or local secondary storage (e.g., local disks (e.g., hard disk drive (HDD), solid-state drive (SSD))). The memory units of the arrays of CGR units may include PMUs, latches, registers, and/or caches (e.g., SRAM).

The pool of reconfigurable data flow resources 678 is dynamically scalable to meet the performance objectives of applications 602 (or user applications 602). In some implementations, the applications 602 access the pool of reconfigurable data flow resources 678 over one or more networks (e.g., internet).

The pool of reconfigurable data flow resources 678 may have different compute scales and hierarchies according to different implementations of the technology disclosed.

Figure 9:
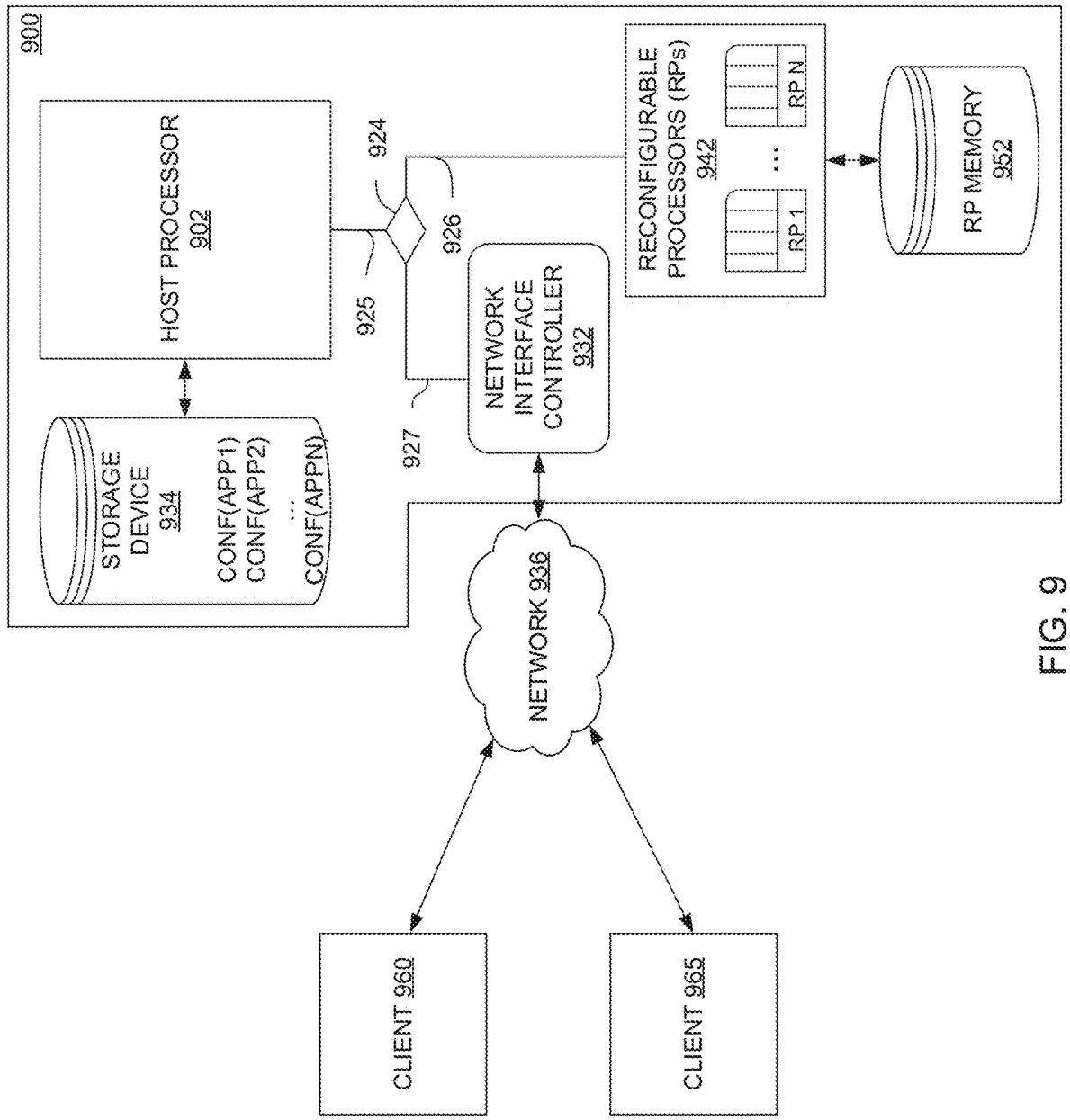
FIG. 9 is a diagram of an illustrative data processing system that is coupled by a network to clients in a client server-configuration and that includes reconfigurable processors in a pool of reconfigurable data flow resources, a host processor, and a storage device that stores configuration files for configuring the reconfigurable processors.

In one example, the pool of reconfigurable data flow resources 678 is a node (or a single machine) as further described herein with reference to FIG. 9. Illustratively, the node may include arrays of CGR units that are arranged in a plurality of reconfigurable processors, supported by bus and CGR processor memory. The node also includes a host processor (e.g., CPU) that exchanges data with the plurality of reconfigurable processors, for example, over a PCIe interface. The host processor includes a runtime processor 666 that manages resource allocation, memory mapping, and execution of the configuration files for applications requesting execution from the host processor.

In another example, the pool of reconfigurable data flow resources 678 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 678 is a pod that comprises a plurality of racks. In yet another example, the pool of reconfigurable data flow resources 678 is a superpod that comprises a plurality of pods. In yet another example, the pool of reconfigurable data flow resources 678 is a zone that comprises a plurality of superpods. In yet another example, the pool of reconfigurable data flow resources 678 is a data center that comprises a plurality of zones.

Users may execute applications 602 on the compute environment 600. Therefore, applications 602 are sometimes also referred to as user applications. The applications 602 are executed on the pool of reconfigurable data flow resources 678 in a distributed fashion by programming the individual compute and memory components to asynchronously receive, process, and send data and control information.

In the pool of reconfigurable data flow resources 678, computation can be executed as deep, nested data flow pipelines that exploit nested parallelism and data locality very efficiently. These data flow pipelines contain several stages of computation, where each stage reads data from one or more input buffers with an irregular memory access pattern, performs computations on the data while using one or more internal buffers or scratchpad memory to store and retrieve intermediate results, and produce outputs that are written to one or more output buffers. The structure of these pipelines depends on the control and data flow graph representing the application. Pipelines can be arbitrarily nested and looped within each other.

The applications 602 comprise high-level programs. A high-level program may include source code written in programming languages like C, C++, Java, JavaScript, Python, and/or Spatial, for example, using deep learning frameworks 614 such as PyTorch, TensorFlow, ONNX, Caffe, and/or Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and/or Transformer-XL.

Software development kit (SDK) 642 generates computation graphs (e.g., data flow graphs, control graphs) 636 of the high-level programs of the applications 602. The SDK 642 transforms the input behavioral description of the high-level programs into an intermediate representation such as the computation graphs 636. This may include code optimization steps like false data dependency elimination, dead-code elimination, and constant folding. The computation graphs 636 encode the data and control dependencies of the high-level programs.

The computation graphs 636 comprise nodes and edges. The nodes can represent compute operations and memory allocations. The edges can represent data flow and flow control. In some implementations, each loop in the high-level programs can be represented as a "controller" in the computation graphs 636. The computation graphs 636 support branches, loops, function calls, and other variations of control dependencies. In some implementations, after the computation graphs 636 are generated, additional analyses or optimizations focused on loop transformations can be performed, such as loop unrolling, loop pipelining, loop fission/fusion, and loop tiling.

The SDK 642 also supports programming the reconfigurable data flow resources in the pool of reconfigurable data flow resources 678 at multiple levels, for example, from the high-level deep learning frameworks 614 to C++ and assembly language. In some implementations, the SDK 642 allows programmers to develop code that runs directly on the reconfigurable data flow resources. In other implementations, the SDK 642 provides libraries that contain predefined functions like linear algebra operations, element-wise tensor operations, non-linearities, and reductions that are used for creating, executing, and profiling the computation graphs 636 on the reconfigurable data flow resources. The SDK 642 communicates with the deep learning frameworks 614 via Application Programming Interfaces (APIs) 624.

A compiler 648 transforms the computation graphs 636 into a hardware-specific configuration, which is specified in an execution file 656 generated by the compiler 648. In one implementation, the compiler 648 partitions the computation graphs 636 into memory allocations and execution fragments, and these partitions are specified in the execution file 656. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as intended by the program. Different ones of the execution fragments can contain different amounts of computation. Execution fragments can represent parallel patterns or portions of parallel patterns and are executable asynchronously.

In some implementations, the partitioning of the computation graphs 636 into the execution fragments includes treating calculations within at least one innermost loop of a nested loop of the computation graphs 636 as a separate execution fragment. In other implementations, the partitioning of the computation graphs 636 into the execution fragments includes treating calculations of an outer loop around the innermost loop of the computation graphs 636 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data used to implement the computation graphs 636, and these memory allocations are specified in the execution file 656. Memory allocations define the type and the number of hardware resources (functional units, storage, or connectivity components). Main memory (e.g., DRAM) is memory outside the reconfigurable processors for which the memory allocations can be made. Scratchpad memory (e.g., SRAM) is memory inside the reconfigurable processors for which the memory allocations can be made. Other memory types for which the memory allocations can be made for various access patterns and layouts include read-only lookup-tables (LUTs), fixed size queues (e.g., FIFOs), and register files.

The compiler 648 binds memory allocations to virtual memory units and binds execution fragments to virtual compute units, and these bindings are specified in the execution file 656. In some implementations, the compiler 648 partitions execution fragments into memory fragments and compute fragments, and these partitions are specified in the execution file 656.

The compiler 648 assigns the memory fragments to the virtual memory units and assigns the compute fragments to the virtual compute units, and these assignments are specified in the execution file 656. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 648 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file 656. The compiler 648 places the physical memory units and the physical compute units onto positions in the arrays of CGR units of the pool of reconfigurable data flow resources and routes data and control networks between the placed positions, and these placements and routes are specified in the execution file 656.

The compiler 648 may translate the applications 602 developed with commonly used open-source packages such as Keras and/or PyTorch into reconfigurable processor specifications. The compiler 648 generates the configuration files with configuration data for the placed positions and the routed data and control networks. In one implementation, this includes assigning coordinates and communication resources of the physical memory and compute units by placing and routing units onto the arrays of the CGR units while maximizing bandwidth and minimizing latency.

A runtime processor 666 (e.g., host processor 180 of FIG. 1 executing runtime processes) receives the execution file 656 from the SDK 642 and uses the execution file 656 for resource allocation, memory mapping, and execution of the configuration files for the applications 602 on the pool of reconfigurable data flow resources 678. The runtime processor 666 may communicate with the SDK 642 over APIs 654 (e.g., Python APIs). If desired, the runtime processor 666 can directly communicate with the deep learning frameworks 614 over APIs 652 (e.g., C/C++ APIs).

The portions of the runtime processor 666 that are dedicated to the execution of an application 602 together with the resources in the pool of reconfigurable data flow resources 678 that are configured for the execution of the application 602 are sometimes also referred to as runtime context. For example, the pool of reconfigurable data flow resources 678 may be configured to execute a first application 602 in a first runtime context and a second application 602 in a second runtime context.

In some implementations, a storage device may store a plurality of configuration files for a plurality of applications. If desired, the plurality of applications may include a collection of predetermined applications such as ML applications for which the SDK 642 and the compiler 648 have generated configuration files that are stored in the storage device. Illustratively, the storage device may store first and second configuration files that are associated with the first and second applications and used for configuring the pool of reconfigurable data flow resources 678 so that the pool of reconfigurable data flow resources 678 is configured to execute the first and second applications 602.

The runtime processor 666 may be operatively coupled to the pool of reconfigurable data flow resources 678 via a local bus 672. If desired, the local bus 672 may be a PCIe bus or any other local bus that enables the runtime processor 666 to exchange data with the pool of reconfigurable data flow resources 678.

The runtime processor 666 parses the execution file 656, which includes a plurality of configuration files. Configuration files in the plurality of configurations files include configurations of the virtual data flow resources that are used to execute the user applications 602. The runtime processor 666 allocates a subset of the arrays of CGR units in the pool of reconfigurable data flow resources 678 to the virtual data flow resources.

In some implementations, a storage device may store the first and second configuration files as mentioned above, and the runtime processor 666 may receive identifiers of the first and second applications and retrieve the first and second configuration files from the storage device using the identifiers of the first and second applications.

The runtime processor 666 then loads the configuration files for the applications 602 to the allocated subset of the arrays of CGR units. In the scenario in which the execution file 656 includes two user applications 602 (e.g., the first and second applications mentioned above), the runtime processor 666 may be configured to start first and second runtime contexts using the first and second configuration files.

The pool of reconfigurable data flow resources 678 may execute the first application in the first runtime context, for example using a first subset of the arrays of CGR units in the pool of reconfigurable data flow resources 678, and execute the second application in the second runtime context, for example using a second subset of the arrays of CGR units in the pool of reconfigurable data flow resources 678. In some implementations, the CGR processor memory and the arrays of CGR units of one or more reconfigurable processors in the pool of reconfigurable data flow resources 678 are aggregated as a uniform pool of resources that are assigned to the execution of the first and second user applications 602. The runtime processor 666 then starts execution of the first and second applications 602 in the first and second runtime contexts, for example using the first and second subsets of the arrays of CGR units.

An application for the purposes of this description includes the configuration files for reconfigurable data flow resources in the pool of reconfigurable data flow resources 678 compiled to execute a mission function procedure or set of procedures such as inferencing or learning in an artificial intelligence or machine learning system. A virtual machine for the purposes of this description comprises a set of reconfigurable data flow resources (including arrays of CGR units in one or more reconfigurable processor, bus, and CGR processor memory) configured to support execution of an application in arrays of CGR units and associated bus and CGR processor memory in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 678 that are also used in the application, and so the configuration files for the application include the configuration data for its corresponding virtual machine, and links the application to a particular set of CGR units in the arrays of CGR units and associated bus and CGR processor memory.

The runtime processor 666 may implement an application in a virtual machine. The virtual machine is allocated a particular set of CGR units, which can include some or all CGR units of a single reconfigurable processor or of multiple reconfigurable processors, along with associated bus and CGR processor memory (e.g., PCIe channels, DMA channels, DDR channels, DRAM memory).

Figure 7A:
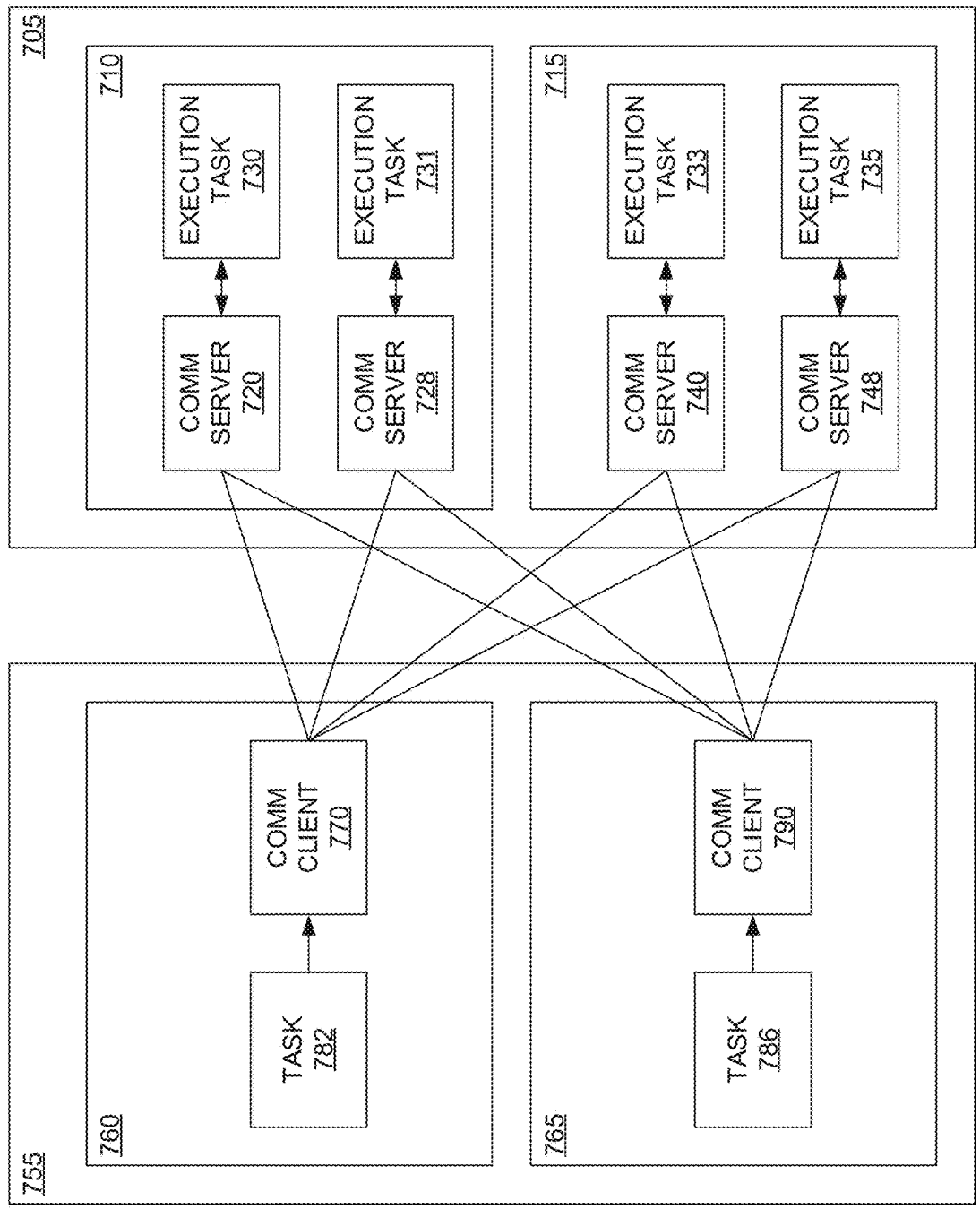
FIG. 7A is a diagram of an illustrative client-server configuration for executing a plurality of applications that a client in the client-server configuration can offload as execution tasks for execution on the server.

FIG. 7A shows an illustrative system with heterogeneous node types. As shown, the illustrative system may include two supercomputer nodes 760, 765 and two reconfigurable processor nodes 710, 715. If desired, the illustrative system may include any number of computation nodes 760, 765 other than supercomputer nodes that offload execution tasks for execution on the reconfigurable processor nodes 710, 715. For example, the computation nodes 760, 765 may include mainframe computers, workstations, personal computers, quantum computers, etc.

The supercomputer nodes 760, 765 and the reconfigurable processor nodes 710, 715 may be located together in a same locality. As an example, the supercomputer nodes 760, 765 and the reconfigurable processor nodes 710, 715 may be located in the same system. As another example, the supercomputer nodes 760, 765 and the reconfigurable processor nodes 710, 715 may be housed in different systems that are located close to each other in a same physical location. If desired, the reconfigurable processor nodes 710, 715 may be located remotely from the supercomputer nodes 760, 765.

In some implementations, each one of the two reconfigurable processor nodes 710,715 may be implemented by a pool of reconfigurable data flow resources (e.g., pool of reconfigurable data flow resources 678 of FIG. 6) that includes several reconfigurable processors together with associated reconfigurable processor memory. As an example, the reconfigurable processor nodes 710, 715 may each include 8 reconfigurable processors and 3 TB of memory. If desired, the reconfigurable processor nodes 710, 715 may be implemented using a different number of reconfigurable processors and/or a different amount of memory. For example, the reconfigurable processor nodes 710, 715 may each include 20 reconfigurable processors and 6 TB of memory. The reconfigurable processors may include any suitable type of coarse-grained reconfigurable processor and/or a mix of different types of coarse-grained reconfigurable processors. If desired, reconfigurable processor node 710 may include a different number of reconfigurable processors and/or a different amount of memory than reconfigurable processor node 715. Illustratively, the data processing system 100 of FIG. 1 or the data processing system 900 of FIG. 9 may implement reconfigurable processor nodes 710, 715. Therefore, a reconfigurable processor node is sometimes also referred to as "data processing system".

Illustratively, the supercomputer nodes 760, 765 and the reconfigurable processor nodes 710, 715 may implement a client-server configuration in which the reconfigurable processor nodes 710, 715 are on the server side 705, and the supercomputer nodes 760, 765 are on the client side 755. Therefore, the reconfigurable processor nodes 710, 715 are sometimes also referred to as "server nodes", and the computation nodes 760, 765 are sometimes also referred to as "client nodes".

As shown in FIG. 7A, the client-server configuration includes two reconfigurable processor nodes 710, 715 on the server side 705 and two supercomputer nodes 760, 765 on the client side 755. Thus, the server side 705 and the client side 755 form a heterogeneous system.

Illustratively, the client-server configuration may include any number of reconfigurable processor nodes on the server side 705 and any number of supercomputer nodes on the client side 755. As an example, the server side 705 may include a single reconfigurable processor node, and the client side 755 may include a single supercomputer node. As another example, the server side 705 may include a single reconfigurable processor node, and the client side 755 may include N supercomputer nodes, where N is an integer greater than one. As yet another example, the server side 705 may include M reconfigurable processor nodes, where M is an integer greater than one, and the client side 755 may include a single supercomputer node. As yet another example, the server side 705 may include M reconfigurable processor nodes, where M is an integer greater than one, and the client side 755 may include N supercomputer nodes, where N is an integer greater than one. In some implementations, M is equal to N. In other implementations, M is not equal to N.

As shown in FIG. 7A, the client nodes 760, 765 may offload execution tasks 730, 731, 733, 735 for execution on the reconfigurable processor nodes 710, 715, while the supercomputer nodes 760, 765 execute tasks 782, 786, respectively. In some implementations, tasks 782, 786 may pause while the offloaded execution tasks 730, 731, 733, 735 are executed by the reconfigurable processor nodes 710, 715.

Illustratively, the supercomputer nodes 760, 765 may include communication units 770, 790, respectively, that act as communication clients. Communication units 770, 790 may communicate with counterpart communication units 720, 728, 740, 748 that act as communication servers in the reconfigurable processor nodes 710, 715. For example, communication units 770, 790 and communication units 720, 728, 740, 748 may exchange data for the purpose of offloading and executing execution tasks from the client nodes 760, 765 to the reconfigurable processor nodes 710, 715.

Figure 7B:
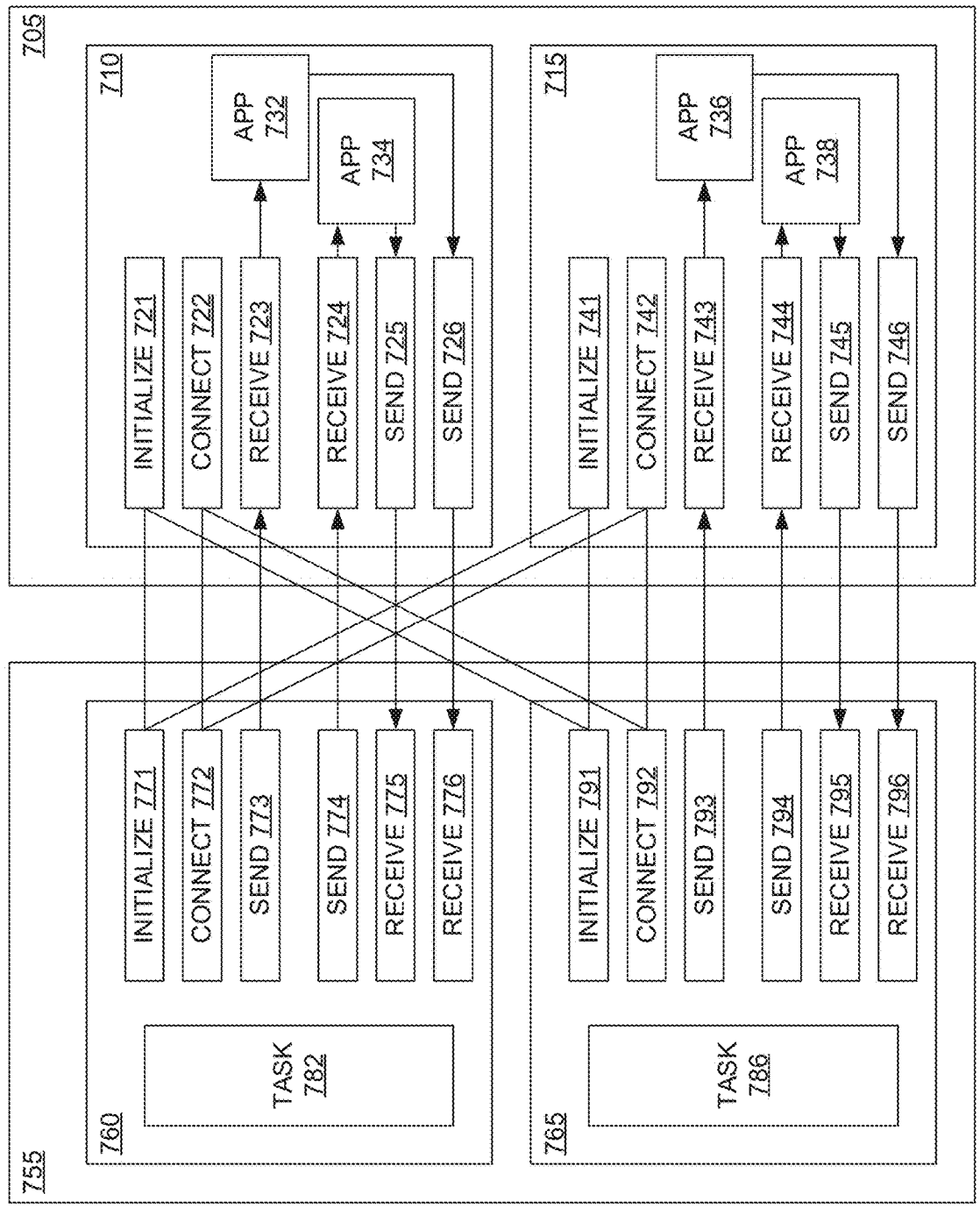
FIG. 7B is a diagram of illustrative communications in a client-server configuration in which a client offloads execution tasks for execution on the server.

FIG. 7B is a diagram of illustrative communications in a client-server configuration in which two computation nodes 760, 765 (e.g., supercomputer nodes, mainframe computers, workstations, personal computers, quantum computers, etc.) on the client side 755 offload execution tasks for execution on two reconfigurable processor nodes 710, 715 on the server side 705. As shown in FIG. 7B, the client nodes 760, 765 and the server nodes 710, 715 are both initialized and set up during initialization operations 771, 791, 721, 741, respectively.

When a client node 760, 765 is ready to offload an execution task for execution on one of the server nodes 710, 715, the client node 760, 765 may connect with the server nodes 710, 715 during operations 772, 792, respectively. The server nodes 710, 715 may establish a session with the client nodes 760, 765, for example by accepting the connection during operations 722, 742, respectively, and confirming establishment of the connection back to the client nodes 760, 765.

In a next step, the client node 760, 765 may send the input parameters and an identifier for an application for execution to the server node 710, 715. As an example, consider the scenario in which client node 760 wants to offload execution tasks that include applications 732 and 734 for execution on server node 710, and client node 765 wants to offload execution tasks that include applications 736 and 738 for execution on server node 715. Illustratively, the applications 732, 734, 736, and/or 738 may include any computational tasks that are advantageously executed by reconfigurable processor nodes 710, 715. As an example, the computational task may include an ML task such as the stochastic gradient descent (SGD) or a deep learning task. Consider further that the server nodes 710, 715 include a pool of reconfigurable data flow resources (e.g., pool of reconfigurable data flow resources 678 of FIG. 6) and that the pool of reconfigurable data flow resources of server node 710 is configured to execute application 732 in a first runtime context and application 734 in a second runtime context, while the pool of reconfigurable data flow resources of server node 715 is configured to execute application 736 in a third runtime context and application 738 in a fourth runtime context.

In this scenario, client node 760 may send 773 a first execution request for executing application 732 to the server node 710. For example, the client node 760 may send the input parameters and the identifier of application 732 to server node 710. The server node 710 may receive 723 the first execution request for executing application 732 from the client node 760. For example, the server node 710 may receive the input parameters and the identifier of application 732. In response to receiving the first execution request, the server node 710 may start a first execution of application 732 in the first runtime context (e.g., on one or more reconfigurable processors in server node 710).

Similarly, client node 760 may send 774 a second execution request for executing application 734 to the server node 710. For example, the client node 760 may send the input parameters and the identifier of application 734 to server node 710. The server node 710 may receive 724 the second execution request for executing application 734 from the client node 760. For example, the server node 710 may receive the input parameters and the identifier of application 734. In response to receiving the second execution request, the server node 710 may start a second execution of application 734 in the second runtime context. If desired, the server node 710 may be configured to balance a first load from the first execution with a second load from the second execution (e.g., on one or more reconfigurable processors in server node 710). The server node 710 may send 725, 726 output data back to the client node 760, which may receive 775, 776 the output data.

Furthermore, client node 765 may send 793, 794 a third execution request for executing application 736 and a fourth execution request for executing application 738 to the server node 715. For example, the client node 765 may send the input parameters and the identifier of applications 736, 738 to server node 715. The server node 715 may receive 743, 744 the third and fourth execution requests for executing application 736, 738 from the client node 765. For example, the server node 715 may receive the input parameters and the identifiers of applications 736, 738. In response to receiving the third and fourth execution requests, the server node 715 may start third and fourth executions of applications 736, 738 in the third and fourth runtime context, respectively. If desired, the server node 715 may be configured to balance a third load from the third execution with a fourth load from the fourth execution (e.g., on one or more reconfigurable processors in server node 710). The server node 715 may send 745, 746 output data back to the client node 765, which may receive 795, 796 the output data.

Figure 8:
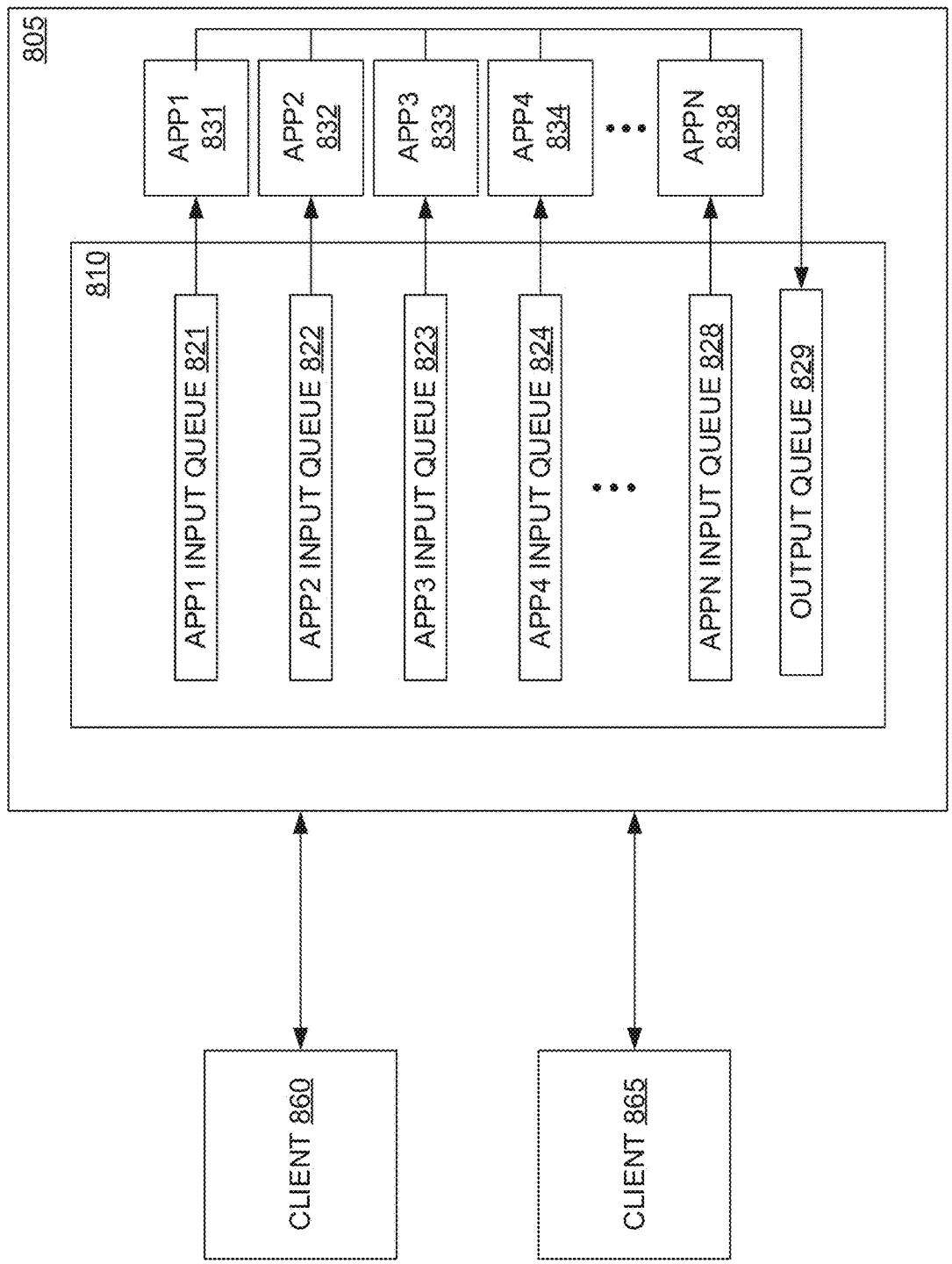
FIG. 8 is a diagram of an illustrative data processing system in a client-server configuration in which an illustrative server has input buffers for receiving execution tasks from clients and an output buffer for providing output data to the clients.

FIG. 8 is a diagram of an illustrative client-server configuration in which an illustrative data processing system 805 has a pool of reconfigurable data flow resources (e.g., pool of reconfigurable data flow resources 678 of FIG. 6) and a server 810 with buffers for receiving input data from clients 860, 865 and for providing output data to clients 860, 865

In some implementations, clients 860, 865 may be located remotely from the data processing system 805. In other implementations, clients 860, 865 and the data processing system 805 may be located close to each other (e.g., in the same system or in different systems that are located close to each other in a same physical location).

Clients 860, 865 may be supercomputer nodes or any other computing nodes that perform computation tasks such as, for example, HPC tasks. If desired, clients 860, 865 may be any data processing nodes that offload execution tasks for execution on data processing system 805.

For example, clients 860, 865 may offload execution tasks that include one or more of applications App1 831, App2 832, App3 833, App4, 832, . . . , AppN 838 for execution onto data processing system 805. Illustratively, the applications 831 to 838 may include any computational task that is advantageously executed by the pool of reconfigurable data flow resources of data processing system 805. As an example, the computational task may include an ML task such as the stochastic gradient descent (SGD) or a deep learning task.

Consider the scenario in which applications 831 to 838 are executed continuously in a loop on the data processing system 805. Consider further that the clients 860, 865 are connected to the data processing system 805. In this scenario, the clients 860, 865 can send a request for any application of the applications 831 to 838 that are executing on the data processing system 805 (e.g., identified through an application identifier) together with input data.

As an example, client 860 wants to execute App1 831 and client 865 also wants to execute App1 831. The server 810 may receive different requests for executing App1 831 from clients 860, 865, respectively, put the requests in a queue, and execute the application App1 in order in a runtime context of the data processing system 805. If desired, the server 810 may balance the load from executing the two requests for executing App1 831. For example, if no other clients are executing App1 831, the server 810 may reconfigure the pool of reconfigurable data flow resources of the data processing system 805 so that the pool of reconfigurable resources is configured to execute two instances of App1 831 in two different runtime contexts and execute the two instances of App1 831 in parallel in the two different runtime contexts.

As another example, client 860 wants to execute App1 831 and client 865 wants to execute App2 832. The server 810 may receive requests for executing App1 831 from client 860 and for executing App2 832 from client 865 and execute the applications App1 831 and App2 832 simultaneously, if no other clients are executing App1 831 and App2 832, in two different runtime contexts of the data processing system 805. Thereby, the server 810 may be configured to balance a load from executing App1 831 with another load from executing App2 832.

Illustratively, there may be any combination between an arbitrary number of clients and an arbitrary number of applications that are being executed in the data processing system 805. As an example, a single client can execute one or more applications in the data processing system 805. If the single client executes more than one application, each one of the more than one application can be a different application. If desired, at least two of the more than one application can be a same application. As another example, multiple clients can execute the same application in the data processing system 805. If desired, at least one of the multiple clients may execute a different application in the data processing system 805 than the other ones of the multiple clients.

Once the data processing system 805 has finished executing the respective applications using the input data, the data processing system 805 may send the output data from the execution of the applications back to the clients 860, 865.

The data processing system 805 may include a pool of reconfigurable data flow resources. The pool of reconfigurable data flow resources may include arrays of coarse-grained reconfigurable CGR units. If desired, the pool of reconfigurable data flow resources may include one or more CGR processors 110 of FIG. 1 that includes CGR arrays 120.

Data processing system 805 may include a predetermined number of reconfigurable processors in the pool of reconfigurable data flow resources. As an example, data processing system 805 may include eight reconfigurable processors in the pool of reconfigurable data flow resources. As another example, data processing system 805 may include 16, 32, 64, or more reconfigurable processors in the pool of reconfigurable data flow resources, whereby the number of reconfigurable processors is not limited to be a power of two. Instead, the data processing system 805 may include any number of reconfigurable processors in the pool of reconfigurable data flow resources.

The pool of reconfigurable data flow resources in data processing system 805 may be partitionable into an arbitrary number of partitions that each can be independently configured and thus execute a different application of applications 831 to 838. If desired, the pool of reconfigurable data flow resources may be partitionable into a predetermined number of partitions. If desired, each partition of the predetermined number of partitions includes at least one array of coarse-grained reconfigurable units. For example, the partitions may be arranged in a predetermined number of compute units that can be independently configured from each other.

As an example, consider the scenario in which the data processing system 805 includes eight reconfigurable processors in the pool of reconfigurable data flow resources that can each be partitioned into four partitions. In this scenario, the data processing system 805 may execute up to 32 applications in parallel in a time-division multiplex manner (i.e., at the same time). As another example, consider the scenario in which the data processing system 805 includes 16 reconfigurable processors in the pool of reconfigurable data flow resources, whereby the first eight of the 16 reconfigurable processors can each be partitioned into M partitions and the second eight of the 16 reconfigurable processors can each be partitioned into N partitions, whereby M and N are integers greater than zero. In this scenario, the data processing system 805 may execute up to 8*(M+N) applications in parallel in a time-division multiplex manner.

Illustratively, the data processing system 805 may include a server 810 with buffers for facilitating data exchange between the clients 860, 865 and the pool of reconfigurable data flow resources in the data processing system 805. The buffers may operate in first-in, first-out (FIFO) mode. Buffers that operate in FIFO mode are sometimes also referred to as queues.

As shown in FIG. 8, the server 810 may include input buffers 821, 822, 823, 824, . . . , 828 for receiving execution tasks from clients 860, 865 and an output buffer 829 for providing output data to clients 860, 865.

In some implementations, the server 810 may include one input buffer that operates in FIFO mode for every application 831 to 838 that can be executed on the data processing system 805. For example, the server 810 may include N input buffers 821 to 828 if the data processing system 805 can execute N applications (e.g., applications 831 to 838) in parallel, whereby each application App1 831, App2 832, App3 833, App4 834, . . . , and AppN 838 has an associated input buffer 821, 822, 823, 824, . . . , and 828 for receiving input data from a client 860, 865. If desired, the number of input buffers may be configurable. For example, the number of input buffers may be selected to include a predetermined number of input buffers per input tensor per application.

Alternatively, the server 810 may include one input buffer that operates in FIFO mode for every instance of an application that is being executed on the data processing system 805. As an example, the server 810 may include five input buffers if the data processing system 805 is executing three instances of application App1 831 and two instances of application App2 832 at the same time, whereby each one of the three instances of application App1 831 has an associated buffer for receiving input data from a client 860, 865 and each one of the two instances of application App2 832 has an associated buffer for receiving input data from a client 860, 865. As another example, the server 810 may include three input buffers if the data processing system 805 is executing one instance of each one of applications App1 831, App2 832, and AppN 838 at the same time, whereby each application App1 831, App2 832, and AppN 838 has an associated input buffer for receiving input data from a client 860, 865.

The server 810 may include one output buffer 829 that receives the output data from the applications 831 to 838 that are being executed on the data processing system 805. If desired, the output buffer 829 operates in FIFO mode. The output data may be associated with identifying information to ensure that the output data can only be retrieved by an authorized client 860, 865. If desired, the server 810 may include more than one output buffer. For example, the server 810 may include as many output buffers as instances of applications are being executing on the data processing system 805. Thus, each instance of an application that is being executed on the data processing system 805 may be associated with a separate output buffer. Alternatively or additionally, the output data may be transferred directly from the device memory of the reconfigurable processor that executes the application (e.g., from CGR processor memory 190 that is associated with CGR processor 110 of FIG. 1 or from memory units in CGR array 120 of FIG. 1) to the client 860, 865. If desired, the number of output buffers may be configurable. For example, the number of output buffers may be selected to include a predetermined number of output buffers per output tensor per application.

Consider the scenario in which the server 810 includes an input buffer per application that is executed on the data processing system 805. In this scenario, a client 860, 865 may send a request to the server 810 for execution of an application. The request may include the identifier of the application (e.g., App1 831) and the address for writing the output data. In response, the server 810 may execute the application 831 in one of the runtime contexts of the pool of reconfigurable data flow resources. When the execution of the application 831 is finished, the output data may be written back from the device memory in the pool of reconfigurable resources to the memory of the client 860, 865, whereby the output data may move directly from the reconfigurable processor memory in the data processing system 805 to the client 860*n* 865, if desired, thereby bypassing the output queue 829.

In some implementations, the data processing system 805 may be ready to execute a predetermined number of applications (e.g., ML tasks) that are identified by an application identifier (e.g., applications having application identifiers App1, App2, . . . , AppN). If desired, each application may be associated with a graph or configuration file. The graph or configuration file may be used to configure the pool of reconfigurable data flow resources such that the pool of reconfigurable data flow resources is configured to execute the associated application in a runtime context.

Illustratively, the graph or configuration file may be stored in an archive for configuration files. The archive for configuration files may include one or more storage devices.

FIG. 9 is a diagram of an illustrative data processing system 900 in a client-server configuration for executing first and second applications (e.g., App1 831 and App2 832 of FIG. 8) that a client (e.g., client 960, 965, which is sometimes also referred to as client node 960, 965) in the client-server configuration can offload for execution onto the data processing system 900. In some implementations, a network 936 may couple the data processing system 900 with clients 960, 965 in the client server-configuration.

Examples of the network 936 include a Storage Area Network (SAN), a Local Area Network (LAN), and a Wide Area Network (WAN). The SAN can be implemented with a variety of data communications fabrics, devices, and protocols. For example, the fabrics for the SAN can include Fibre Channel, Ethernet, InfiniBand™, Serial Attached Small Computer System Interface ('SAS'), or the like. Data communication protocols for use with the SAN can include Advanced Technology Attachment ('ATA'), Fibre Channel Protocol, Small Computer System Interface ('SCSI'), Internet Small Computer System Interface ('iSCSI'), Hyper-SCSI, Non-Volatile Memory Express ('NVMe') over Fabrics, or the like.

The LAN can also be implemented with a variety of fabrics, devices, and protocols. For example, the fabrics for the LAN can include Ethernet (e.g., 802.3), wireless (e.g., 802.11), or the like. Data communication protocols for use in the LAN can include Transmission Control Protocol ('TCP'), User Datagram Protocol ('UDP'), Internet Protocol (IP), Hypertext Transfer Protocol ('HTTP'), Wireless Access Protocol ('WAP'), Handheld Device Transport Protocol ('HDTP'), Session Initiation Protocol ('SIP'), Real-time Transport Protocol ('RTP'), or the like.

Illustratively, data may move directly between memory in the client nodes 960, 965 and memory in the data processing system 900, thereby providing for a low latency in executing tasks in the data processing system 900. As an example, the data may move directly between the memory in the client nodes 960, 965 and reconfigurable processor memory 952 that is associated with reconfigurable processors 942, and/or between the memory in the client nodes 960, 965 and the storage device 934 in data processing system 900.

If desired, the connections between the client nodes 960, 965 and the data processing system 900 may be using a remote direct memory access (RDMA) connection. As an example, all the addresses of the client nodes 960, 965 and the data processing system 900 may be known at initialization. Illustratively, such addresses may be IP addresses or if the network 936 includes an InfiniBand (IB) fabric, the addresses may be IB addresses.

Once all the addresses are known, the clients and servers may be connected via RDMA (e.g., using an RDMA application). For example, a server in the data processing system 900 may receive an RDMA connection request for a data exchange associated with an execution request from a client node of the client nodes 960, 965. The security of the communications between the clients and servers may be upheld by the secure nature of the RDMA connections. By way of example, the requests may be fully communicated by the client nodes for security reasons.

The data processing system 900 may include a host processor 902, a storage device 934, and reconfigurable processors 942 and reconfigurable processor memory 952, whereby the reconfigurable processors 942 and the reconfigurable processor memory 952 are arranged in a pool of reconfigurable data flow resources such as reconfigurable data flow resources 678 shown in FIG. 6. If desired, data processing system 900 may include a single reconfigurable processor in the pool of reconfigurable data flow resources. As shown in FIG. 9, the data processing system 900 includes N reconfigurable processors RP1 to RP N in the pool of reconfigurable data flow resources, where N is an integer greater than one.

By way of example, the reconfigurable processors 942 in the pool of reconfigurable data flow resources are Coarse-Grained Reconfigurable Architecture (CGRA) devices. If desired, each reconfigurable processor 942 may include arrays of configurable units (e.g., compute units and memory units) in a programmable interconnect fabric. At least one of the reconfigurable processors 942 in the pool of reconfigurable data flow resources may be partitionable into a predetermined number of partitions. Each partition of the predetermined number of partitions may include at least one array of coarse-grained reconfigurable units. If desired, CGR processor 110 having arrays of CGR units 120 of FIG. 1 may implement the reconfigurable processors 942.

By way of example, the pool of reconfigurable data flow resources in the data processing system 900 may include reconfigurable processor memory 952. The reconfigurable processor memory 952 may include main memory such as dynamic random-access memory (DRAM), flash memory, magnetic disks (e.g., hard disk drive (HDD)), solid-state drives (SSD), optical disks, and/or any other memory type known in the art.

As shown in FIG. 9, the reconfigurable processors 942 may interface with reconfigurable processor memory 952. For example, a memory interface such as memory interface 139 of FIG. 1 may couple the reconfigurable processors 942 with the reconfigurable processor memory 952. In some implementations, each reconfigurable processor of the reconfigurable processors 942 may interface with a respective separate reconfigurable processor memory 952. If desired, the reconfigurable processor memory 952 may be in the same package and/or on the same die as the associated reconfigurable processors 942. In other implementations, a single reconfigurable processor memory 952 may be associated with the reconfigurable processors 942.

In some implementations, the data processing system 900 includes a network interface controller (NIC) 932 that is sometimes also referred to as a "network interface card" 932. Illustratively, the network 936 may connect the NIC 932 with clients 960, 965. The network interface controller (NIC) 932 is operatively coupled to the reconfigurable processors 942 and to the host processor 902.

The host processor 902 is coupled to the storage device 934 and to the reconfigurable processors 942 in the pool of reconfigurable data flow resources. In some implementations, the host processor 902 is coupled to a first local bus 925, the network interface controller (NIC) 932 is coupled to a second local bus 927, and the reconfigurable processors 942 are coupled to a third local bus 926. The local buses 925, 926, 927 may include a Peripheral Component Interconnect Express (PCIe) bus, a Cache Coherent Interconnect for Accelerators (CCIX) protocol bus, a Compute Express Link (CXL) connection, and/or an Open Coherent Accelerator Processor Interface (OpenCAPI). A bus switch 924 in the data processing system 900a may couple the local buses 925, 926, 927, thereby coupling the host processor 902, the reconfigurable processors 942, and the network interface controller 932.

The storage device 934 stores first and second configuration files (e.g., conf(App1), conf(App2)) that are associated with the first and second applications. Illustratively, the first and second configuration files are used for configuring the pool of reconfigurable data flow resources (e.g., a portion of a reconfigurable processors 942 or one or more reconfigurable processors 942) so that the pool of reconfigurable data flow resources is configured to execute the first and second applications.

For example, the host processor 902 may be configured to receive identifiers of the first and second application (e.g., App1 831 and App2 832 of FIG. 8) from the client 960, 965. For simplicity and brevity, each one of the first and second applications is described herein as being executed on a single reconfigurable processor of reconfigurable processors 942. However, without loss of generality, the first and second applications may be executed on more than one reconfigurable processor of reconfigurable processors 942 or on a portion of a reconfigurable processor of reconfigurable processors 942.

In some implementations, the data processing system 900 may include a plurality of IP ports. If desired, the host processor 902 may be configured to receive the execution tasks for different applications of the plurality of applications on different IP ports of the plurality of IP ports.

In some scenarios, the data processing system 900 may include an input buffer that receives the first execution task. For example, the data processing system may include input buffers 821 to 828 of FIG. 8 and may receive the first execution task on input buffer 821. In these scenarios, the host processor 902 may be configured to execute a remote direct memory access (RDMA) operation to transfer input parameters for the first application (e.g., App1) from the client 960, 965 to the input buffer. The host processor 902 may further be configured to receive a status signal from the client 960, 965 indicating that the remote direct memory access operation has been completed.

In response to receiving the identifiers for the first and second applications, the host processor 902 may retrieve the first and second configuration files (e.g., conf(App1) and conf(App2)) from the storage device 934 using the identifiers of the first and second applications, and start the first and second runtime contexts using the first and second configuration files (e.g., by configuring the pool of reconfigurable data flow resources with the first and second configuration files).

In some embodiments, the host processor 902 may be configured as a server, and the server may be configured to start a first execution of the first application in the first runtime context, start a second execution of the second application in the second runtime context, and balance a first load from the first execution with a second load from the second execution.

For example, the server may balance the first load from the first execution with the second load from the second execution based on access to the reconfigurable processor memory 952, based on the availability of resources (i.e., arrays of CGR units or partitions of arrays of CGR units in the reconfigurable processors 942) for the implementation of additional instances of the applications, based on access to the third local bus 926, based on access to the input and output queues, or based on a combination of the above, just to name a few.

In some scenarios, each one of the first and second runtime contexts may be associated with a respective request queue. In these scenarios, the server may be configured to balance the first load from the first execution with the second load from the second execution based on the respective request queue. For example, the server may prioritize execution of the first application (e.g., by configuring an additional runtime context for the execution of the first application in the pool of reconfigurable data resources) if the request queue of the first runtime context includes more requests than the request queue of the second runtime context (i.e., if the request queue of the first runtime context is longer than the request queue of the second runtime context).

In some implementations, the server may prioritize the execution of the application that has the longer execution time. For example, if the execution time of the first application is longer than the execution time of the second application, the server may prioritize execution of the first application. In other implementations, the server may prioritize the execution of the application that has the shorter execution time. For example, if the execution time of the first application is shorter than the execution of the second application, the server may prioritize execution of the first application.

During and/or after the execution of the first and second applications, the pool of reconfigurable data flow resources may provide output data of the execution of the first and second applications to the client 960, 965.

In some implementations, the data processing system 900 may include an output buffer (e.g., output buffer 829 of FIG. 8) for providing the output data to the client 960, 965. If desired, the reconfigurable processor 942 may be configured to write the output data to the output buffer, and send a status signal to the client 960, 965 indicating that the output data is ready to be retrieved.

If desired, the reconfigurable processor 942 may provide the output data in the output buffer with identifying information to ensure that the output data is provided to an authorized client of clients 960, 965 (i.e., a client that is authorized to access the output data).

When the data processing system 900 has finished the execution of the first application, and the output data has been transmitted to the client 960, 965, the client 960, 965 may tear down the current session with the server. In response, the host processor 902 may be configured to detect the tear down of the current session from the client 960, 965 and, in response to detecting the tear down of the current session, the host processor 902 may be configured to invalidate a cache of active session tokens.

Consider the scenario in which the pool of reconfigurable data flow resources of data processing system 900 is configured to execute the first application in a third runtime context. Consider further that the server in the data processing system 900 has already established a session with client 960, but not with client 965, and the server has already received a first execution request for executing the first application. In this scenario, the server in data processing system 900 may be configured to establish a session with the client 965 and receive a third execution request for executing the first application from client 965. In response to receiving the third execution request from client 965, the server may start a third execution of the first application in the third runtime contest. If desired, the server may be configured to balance the first and second loads from executing the first and second applications in the first and second runtime contexts with a third load from the third execution of the first application in the third runtime context.

In some implementations, an input buffer may receive the third execution task with an identifier of the first application (e.g., App1 831 of FIG. 8). If desired, the host processor 902 may be configured to pull the third execution task from the input buffer and execute another remote direct memory access (RDMA) operation to transfer additional input parameters for the first application from the client 965 to the input buffer. In some implementations, the host processor 902 may be configured to receive an additional status signal from the client 965 indicating that the other remote direct memory access operation has been completed.

If desired, the host processor 902 may be configured to retrieve the first configuration file (e.g., conf(App1)) from the storage device 934 using the identifier of the first application, configure the reconfigurable processor 942 with the first configuration file to create the third runtime context, and start execution of the first application in the third runtime context using the additional input parameters. During and/or after execution of the first application, the third runtime context may provide output data of the execution of the first application to the client 965.

Figure 10A:
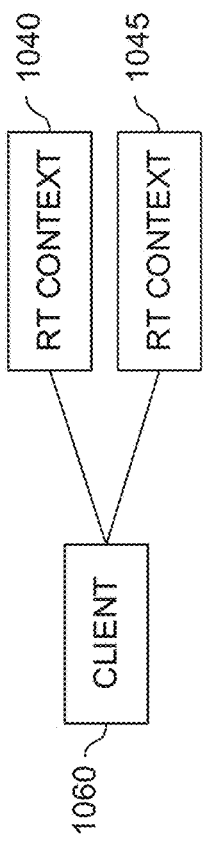
FIG. 10A is a diagram of an illustrative client-server configuration with two clients that are each offloading a single application for execution onto two different runtime contexts.

As mentioned above, it may be desirable to perform load balancing when one or more clients offload the execution of applications to one or more servers. FIG. 10A is a diagram of an illustrative client-server configuration with two clients 1060, 1065 that are each offloading a single application for execution in two different runtime contexts 1040, 1045. In the configuration shown in FIG. 10A, there is a one-to-one mapping between a client node and a runtime context. Therefore, no load balancing is required in the case shown in FIG. 10A.

Figure 10B:
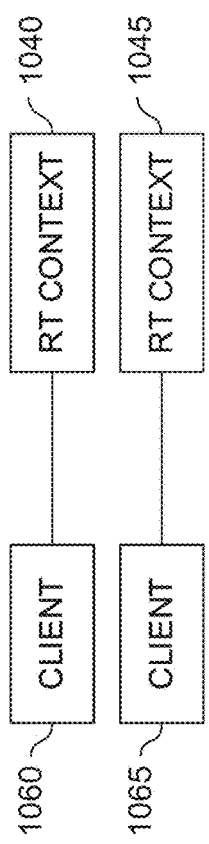
FIG. 10B is a diagram of an illustrative client-server configuration with one client that is offloading two applications for execution onto two different runtime contexts.

FIG. 10B is a diagram of an illustrative client-server configuration with one client 1060 that is offloading two applications for execution in two different runtime contexts 1040, 1045. Illustratively, the applications may execute in runtime contexts 1040, 1045 the same model using the same parameters. The client 1060 can arbitrate communication with multiple application connections. In the scenario shown in FIG. 10B, the client 1060 may distribute and balance the load between the applications executing in runtime contexts 1040 and 1045.

Figure 10C:
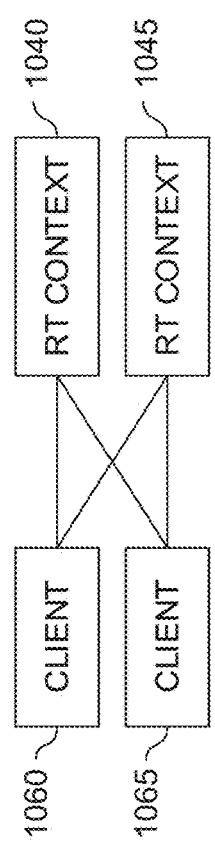
FIG. 10C is a diagram of an illustrative client-server configuration with two clients that are offloading a same application for execution onto a single runtime context.

FIG. 10C is a diagram of an illustrative client-server configuration with two clients 1060, 1065 that are offloading a same application for execution in a single runtime context 1040. Since the clients 1060, 1065 are sharing the same runtime context 1040, the clients 1060, 1065 may serialize updating the model parameters for the execution of the application in runtime context 1040 for consistency of results.

Figure 10D:
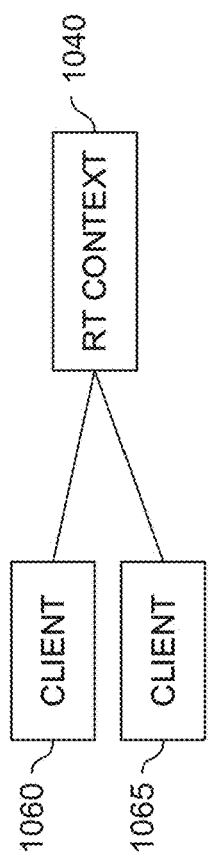
FIG. 10D is a diagram of an illustrative client-server configuration with two clients that are each offloading two applications for execution onto two different runtime contexts.

FIG. 10D is a diagram of an illustrative client-server configuration with two clients 1060, 1065 that are each offloading two applications for execution in two different runtime contexts 1040, 1045. The scenario shown in FIG. 10D is a combination of the scenarios shown in FIG. 10B and FIG. 10C. Thus, the clients 1060, 1065 may distribute and balance the load between the applications executing in runtime contexts 1040, 1045, and the clients 1060, 1065 may serialize updating the model parameters for the execution of the same application in a same runtime context for consistency of results.

Illustratively, the applications that are being executed on the data processing system (e.g., applications App1 831, App2 832, . . . , AppN 838 executed by the pool of reconfigurable data flow resources of the data processing system 805 of FIG. 8) may have different IP addresses.

In some implementations, the client may use a single RDMA connection for transferring data to the server and for receiving data from the server even though the server may have multiple runtime contexts. In this case, the server may perform load balancing between the different runtime contexts for which the server has received execution requests from the client.

In other implementations, for example the client may use different RDMA connections to different portions of memory when connecting to the applications. Thus, the client may initiate a new RDMA connection for each runtime context and the corresponding application that the client wants to connect to. In such a scenario, the client may be coupled to a load balancing device for balancing the load of the execution requests between multiple RDMA connections and thereby between multiple runtime contexts.

In contrast thereto, if multiple clients are sharing a single runtime context, whereby each client has a separate RDMA connection to the single runtime context, the server may round robin on the connected clients (i.e., the server may handle requests or portions of requests from the different connected clients in a repetitive circular order).

Figure 11:
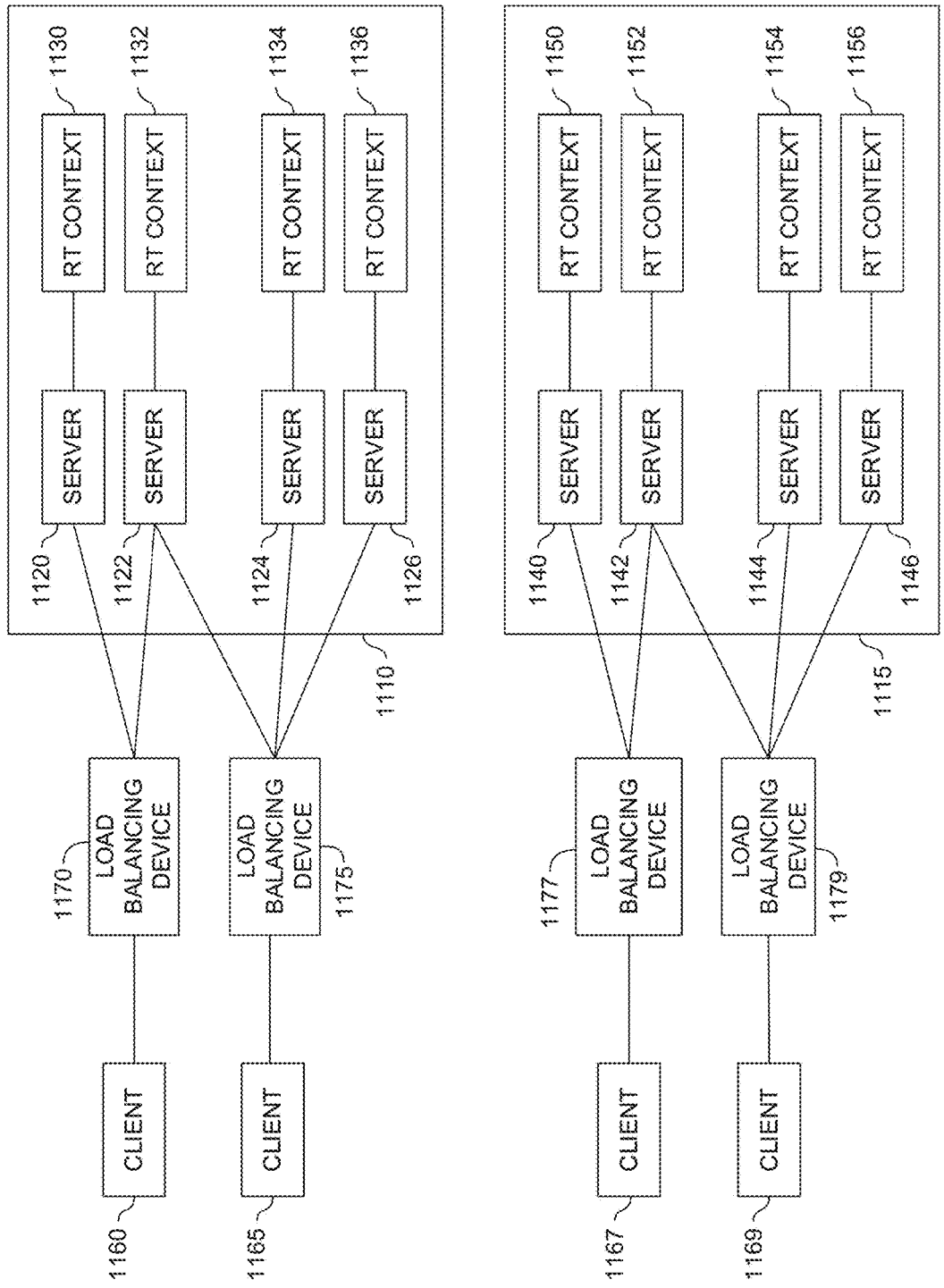
FIG. 11 is a diagram of an illustrative client-server configuration with two instances of two clients that are coupled to a pool of reconfigurable data flow resources, configured to execute applications in runtime contexts, whereby each runtime context has an associated server.

FIG. 11 is a diagram of an illustrative client-server configuration with two instances of two clients 1160, 1165 and 1167, 1169 that are coupled via load balancing devices 1170, 1175, 1177, 1179 to data processing systems 1110 and 1115, respectively. Each data processing system of data processing system 1110, 1115 may include a pool of reconfigurable data flow resources, configured to execute applications in runtime contexts, whereby each runtime context has an associated server. For example, data processing system 1110 may include a first pool of reconfigurable data flow resources that is configured to execute applications in runtime contexts 1130, 1132, 1134, 1136, whereby each runtime context 1130, 1132, 1134, 1136 has an associated server 1120, 1122, 1124, 1126. Similarly, data processing system 1115 may include a second pool of reconfigurable data flow resources that is configured to execute applications in runtime contexts 1150, 1152, 1154, 1156, whereby each runtime context 1150, 1152, 1154, 1156 has an associated server 1140, 1142, 1144, 1146.

Thus, as shown in FIG. 11, each server manages a single runtime context. For example, in data processing system 1110, server 1120 may manage runtime context 1130, server 1122 may manage runtime context 1132, server 1124 may manage runtime context 1134, and server 1126 may manage runtime context 1136. Similarly, in data processing system 1115, server 1140 may manage runtime context 1150, server 1142 may manage runtime context 1152, server 1144 may manage runtime context 1154, and server 1146 may manage runtime context 1156.

In some implementations, a load balancing device (e.g., load balancing device 1170) may be associated with a client. For example, load balancing device 1170 may be associated with client 1160 and load balancing devices 1175, 1177, and 1179 with clients 1165, 1167, and 1169, respectively.

If desired, each server may include the configuration file for the associated runtime context. Thus, the client (e.g., client 1160) may specify which runtime context (e.g., runtime context 1130) to connect to by simply specifying the server (e.g., server 1120) to the load balancing device (e.g., load balancing device 1170), whereas the load balancing device would load balance between different servers. As an example, the load balancing device 1170 or the load balancing device 1175 may balance the load from executing applications on the pool of reconfigurable data flow resources of the data processing system 1110 based on the request queue length for each load balancing device-server connection. As another example, the load balancing device 1170 or the load balancing device 1175 may balance the load from executing applications on the pool of reconfigurable data flow resources of data processing system 1110 based on the execution time of the different runtime contexts 1130, 1132, 1134, 1136, for example if the different runtime contexts map to configuration files that, when being executed on different runtime contexts, have different execution times.

Figure 12:
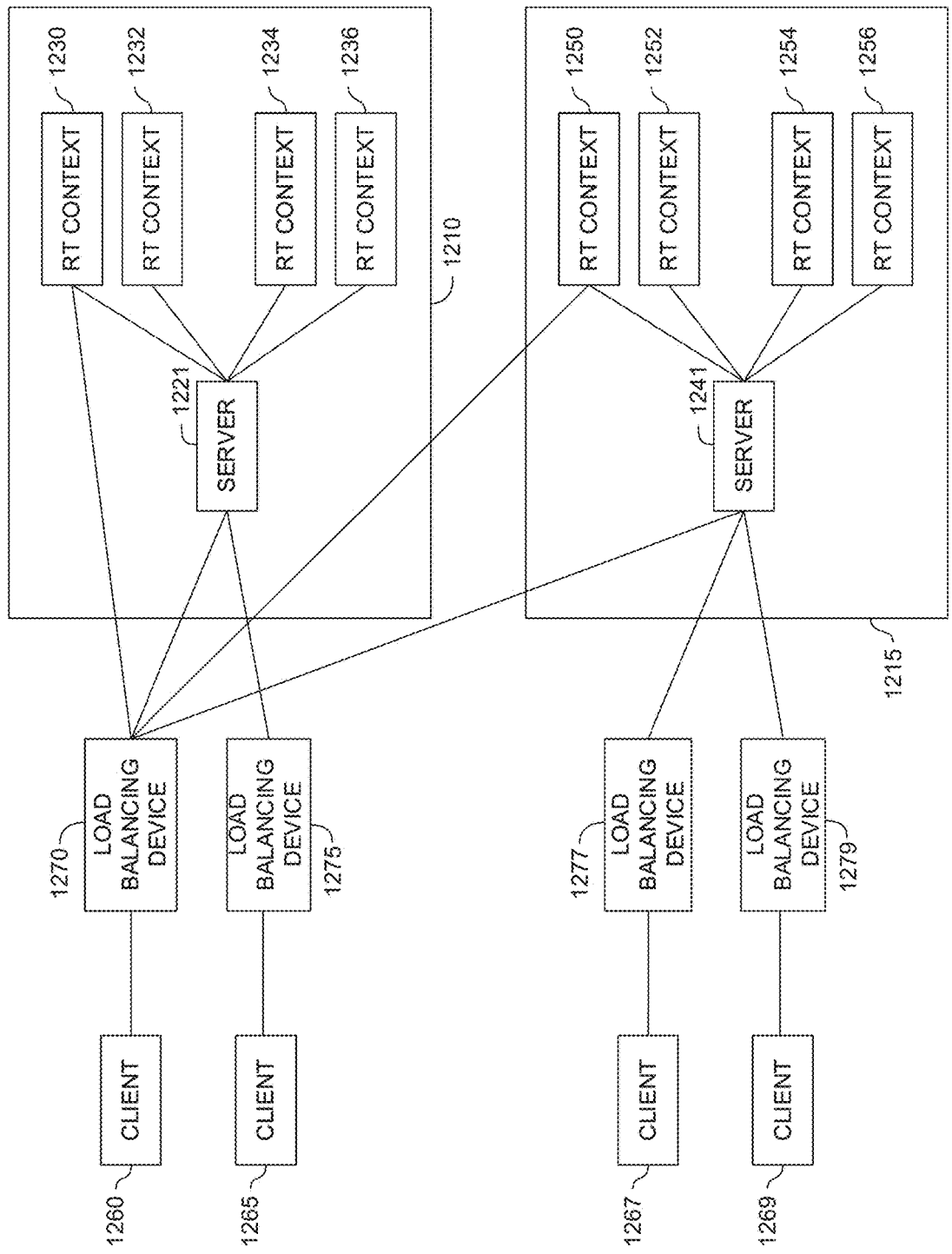
FIG. 12 is a diagram of an illustrative client-server configuration with two instances of two clients that are coupled to a pool of reconfigurable data flow resources, configured to execute applications in runtime contexts, whereby all runtime contexts share a single associated server.

FIG. 12 is a diagram of an illustrative client-server configuration with two instances of two clients 1260, 1265 and 1267, 1269 that are coupled via load balancing devices 1270, 1275, 1277, 1279 to data processing systems 1210 and 1215, respectively. Each data processing system of data processing systems 1210, 1215 may include a pool of reconfigurable data flow resources, configured to execute applications in runtime contexts, whereby each data processing system includes a single server.

For example, data processing system 1210 may include a first pool of reconfigurable data flow resources that is configured to execute applications in runtime contexts 1230, 1232, 1234, 1236, whereby each runtime context 1230, 1232, 1234, 1236 has a same associated server 1221. Similarly, data processing system 1215 may include a second pool of reconfigurable data flow resources that is configured to execute applications in runtime contexts 1250, 1252, 1254, 1256, whereby each runtime context 1250, 1252, 1254, 1256 has a same associated server 1241.

Thus, server 1221 manages all runtime contexts 1230, 1232, 1234, 1236 in the pool of reconfigurable data flow resources of data processing system 1210, and server 1241 manages all runtime contexts 1250, 1252, 1254, 1256 in the pool of reconfigurable data flow resources of data processing system 1215.

Illustratively, server 1221 in data processing system 1210 may include a list for retrieving the configuration file or the configuration files (e.g., from a storage device such as storage device 934 of FIG. 9) for the associated runtime contexts 1230, 1232, 1234, 1236. Similarly, server 1241 in data processing system 1215 may include a list for retrieving the configuration file or the configuration files (e.g., from a storage device such as storage device 934 of FIG. 9) for the associated runtime contexts 1250, 1252, 1254, 1256.

In some implementations, a load balancing device (e.g., load balancing device 1270) may be associated with a client. For example, load balancing device 1270 may be associated with client 1260 and load balancing devices 1275, 1277, and 1279 with clients 1265, 1267, and 1269, respectively.

In some implementations, a client (e.g., client 1260) may specify which runtime context (e.g., runtime context 1230) to connect to by specifying the server (e.g., server 1221) and an application identifier. Thus, in the scenario in which a client has established a plurality of RDMA connections with different servers, the client may balance the load between the different RDMA connections by specifying the server and the runtime context.

Figure 13:
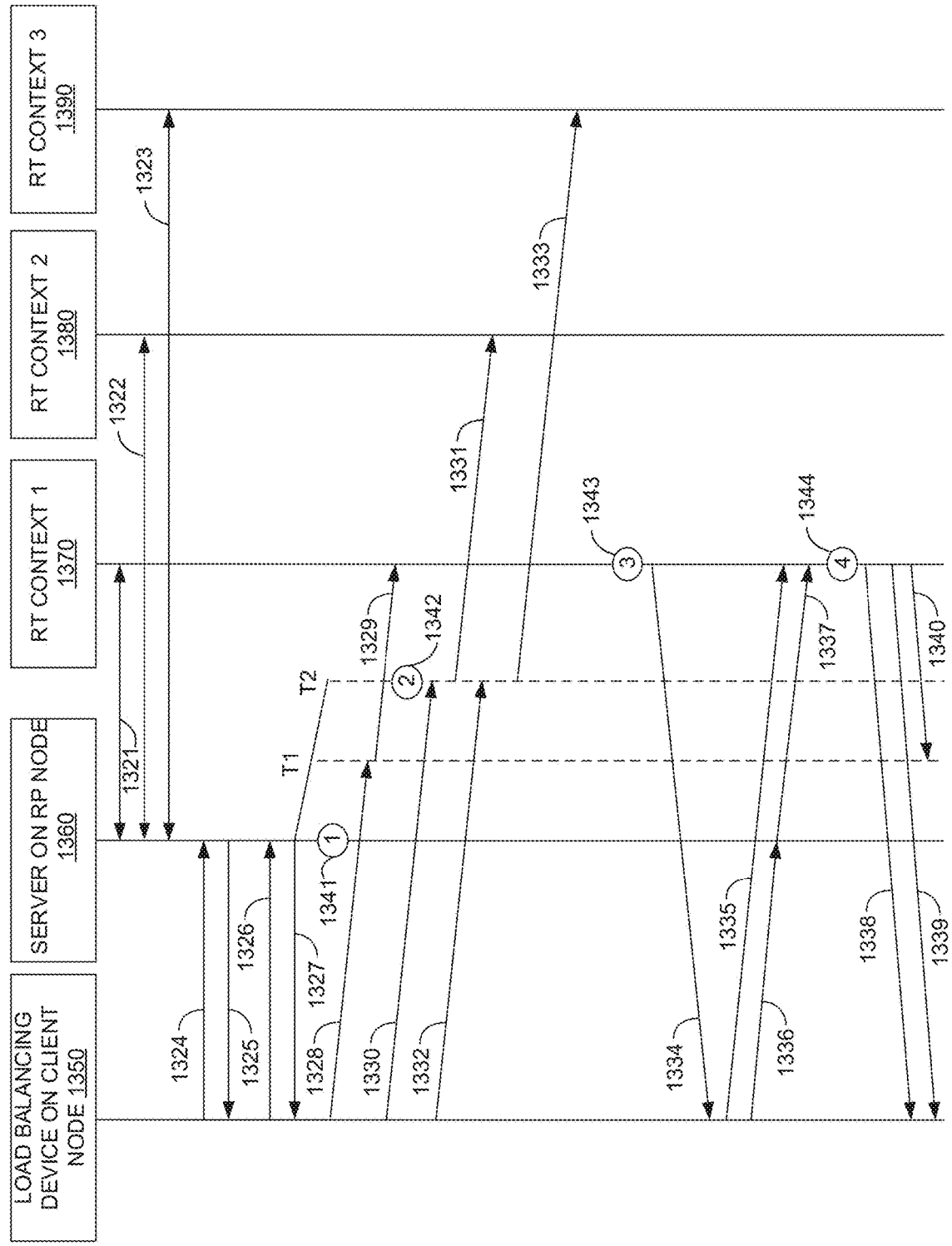
FIG. 13 is a diagram of an illustrative data exchange between a client, a server, and three runtime contexts.

FIG. 13 is a diagram of an illustrative data exchange between a client (e.g., client 1260 of FIG. 12) or a load balancing device 1350 (e.g., load balancing device 1270 of FIG. 12) that is associated with the client, a server 1360 in a reconfigurable processor node such as server 1221 in data processing system 1210 of FIG. 12, and three runtime contexts denoted "RT Context 1" 1370, "RT Context 2" 1380, and RT Context 3" 1390 (e.g., runtime contexts 1230, 1232, and 1234 of FIG. 12). Note, that the server 1360 managing three runtime contexts 1370, 1380, 1390 is provided for illustrative purposes only. If desired, the server 1360 may manage any number of runtime contexts in the associated data processing system.

Illustratively, during initialization of the data processing system, the server 1360 may request the input and output memory bus addresses from the different runtime contexts (i.e., RT context 1 1370, RT context 2 1380, and RT context 3 1390) and memory map these addresses to input and output device memory. For example, during operation 1321, the server 1360 may memory map the input and output memory bus addresses of RT context 1 1370 to device memory addresses A and A', during operation 1322, the input and output memory bus addresses of RT context 2 1380 to device memory addresses B and B', and, during operation 1323, the input and output memory bus addresses of RT context 3 1390 to device memory addresses C and C'.

After initialization of the data processing system, the server 1360 is ready to receive queries 1324 for network devices that represent RT contexts 1, 2, 3 for establishing a session between the server 1360 and a client 1350. Illustratively, the server 1360 can abstract a collection of M physical network devices to a collection of N logical unique connection identifiers. Thus, in response to receiving the queries 1324 for network devices that represent RT contexts 1, 2, 3, the server 1360 may return 1325 connection identifier ID1 that maps to RT context 1 1370 and connection identifier ID2 that maps to RT contexts 2 and 3.

Upon reception of the connection identifiers ID1 and ID2 from the server 1360, the client 1350 may initiate a connection 1326 with RT contexts 1, 2, and 3, which the server 1360 may accept 1327. In response to accepting the connections from the client, the server 1360 may spawn thread T1 for handling execution requests on connection ID1 and thread T2 for handling execution requests on connection ID2 as illustratively shown in FIG. 13. Alternatively, the server 1360 may spawn a single thread for handling all execution requests, if desired.

Illustratively, thread T1 may receive the request 1328 to run RT context 1 with data exchange on connection ID1 (i.e., input device memory address A and output device memory address A') from the client 1350, and thread T2 may receive the request 1330 to run RT context 2 with data exchange on connection ID2 (i.e., input device memory address B and output device memory address B') and the request 1332 to run RT context 3 with data exchange on connection ID2 (i.e., input device memory address C and output device memory address C') from the client 1350. In some implementations, the entire network traffic between the client node and the data processing system can be distributed across all M physical network devices.

In response to receiving the requests 1328, 1330, 1332 from the client 1350, thread T1 may add a new request 1329 to RT context 1 with metadata, while thread T2 may add a new request 1331 to RT context 2 with metadata and a new request 1333 to RT context 3 with metadata.

Thereby, the requests to run the different RT contexts 2, 3 on the same connection identifier ID 2 is being load balanced 1342 on the target RT contexts (i.e., RT contexts 2 and 3). If desired, the server 1360 may be configured to access the request queue and/or the source connection request queue of the target RT contexts, RT context 2 and RT context 3, in a round-robin manner on thread T2. If desired, the request to run the different RT contexts 1, 2 on different connection identifiers ID 1 and ID2 is being load balanced 1341 based on the target RT context's request queue length.

Consider the scenario in which RT context 1 1370 is free. In this scenario, RT context 1 1370 may pull a new request 1343 from the request queue and initiate 1334 an RDMA read operation. Alternatively, the client 1350 may submit a new request for running RT context 1 1370 and subsequently initiate an RDMA read operation. During the RDMA read operation 1335, input data may be transferred from the client 1350 to the input buffer of RT context 1 1370. The client 1350 may transmit a status signal 1336 (e.g., RDMA read done) to the server 1360 indicating that the RDMA read operations have completed. Upon reception of the status signal, the server 1360 may direct RT context 1 1370 to execute the corresponding application 1337. In response to receiving the command to execute the application 1337 from the server 1360, RT context 1 1370 may execute 1344 the application.

Upon completion of the execution 1344 of the application on RT context 1 1370, the RT context 1 1370 may initiate an RDMA write operation 1338 to the output buffer at address A', followed by a status signal 1339 indicating that the RDMA write operation has completed (e.g., RDMA write done). Once the RDMA write operation has completed, RT context 1 1370 may inform 1340 thread T1 that the request has been executed.

Figure 14:
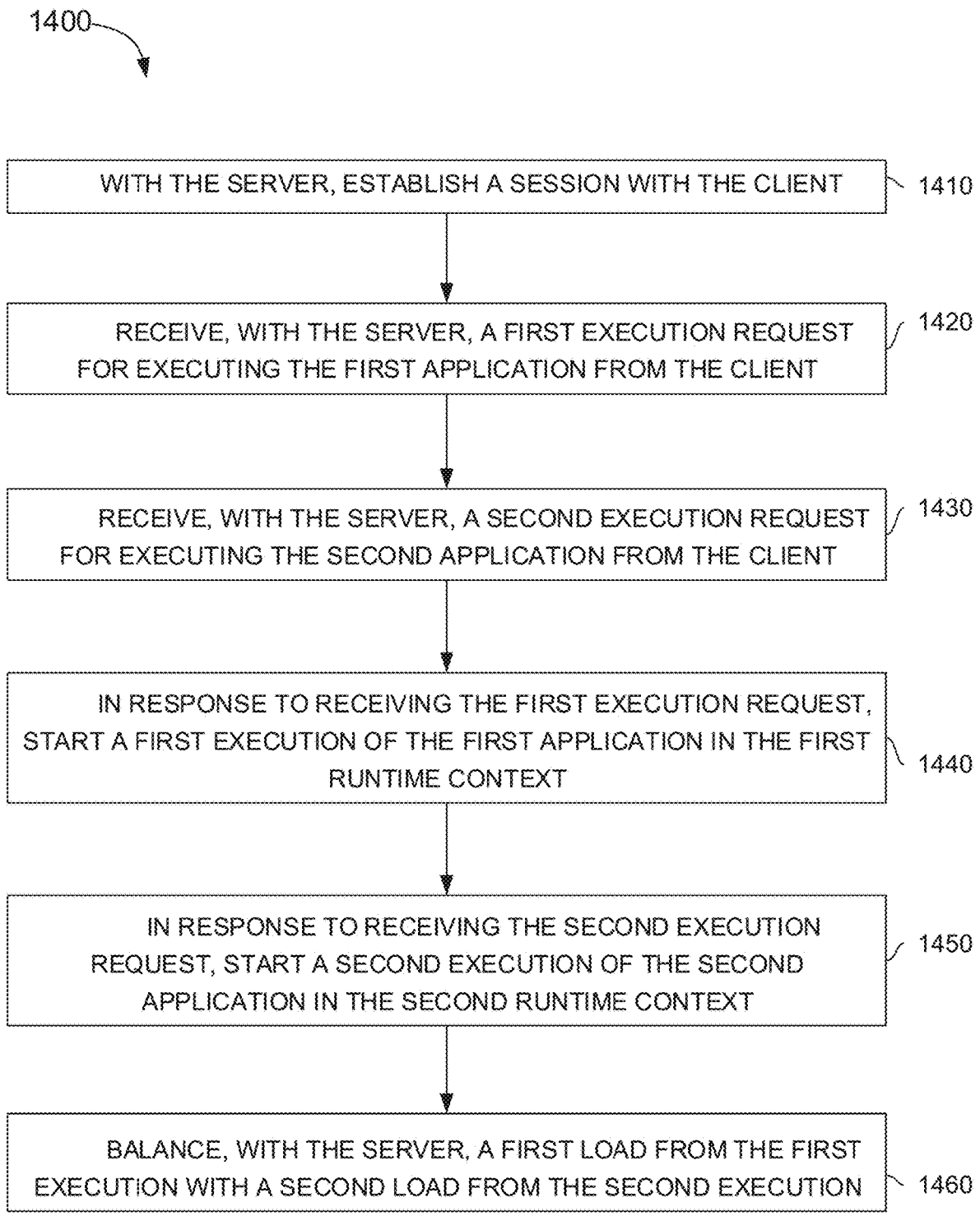
FIG. 14 is a flowchart showing illustrative operations that a data processing system in a client-server configuration performs for balancing the load from executing applications that a client can offload as execution tasks for execution onto the data processing system.

FIG. 14 is a flowchart 1400 showing illustrative operations that a data processing system (e.g., data processing system 1210 of FIG. 12) in a client-server configuration performs for balancing the load from executing first and second applications that a client (e.g., client 1260 of FIG. 12) can offload as execution tasks for execution onto the data processing system. Illustratively, the data processing system includes a pool of reconfigurable data flow resources that is configured to execute the first application in a first runtime context (e.g., RT context 1230 of FIG. 12) and the second application in a second runtime context (e.g., RT context 1232 of FIG. 12). The data processing system further includes a server (e.g., server 1221 of FIG. 12) in the client-server configuration that is coupled to the pool of reconfigurable data flow resources and to the client.

During operation 1410, the data processing system may, with the server, establish a session with the client. For example, the server 1221 of FIG. 12 may establish a session with client 1260 by abstracting a collection of M physical network devices to a collection of N logical unique connection identifiers, and wait for queries for network devices that represent runtime contexts.

During operation 1420, the data processing system may receive, with the server, a first execution request for executing the first application from the client. For example, the server 1221 of the data processing system 1210 of FIG. 12 may receive a first execution request for executing the first application from the client 1260.

During operation 1430, the data processing system may receive, with the server, a second execution request for executing the second application from the client. For example, the server 1221 of the data processing system 1210 of FIG. 12 may receive a second execution request for executing the second application from the client 1260.

During operation 1440, the data processing system may, in response to receiving the first execution request, start a first execution of the first application in the first runtime context. For example, the data processing system 1210 of FIG. 12 may start a first execution of the first application in RT context 1230.

During operation 1450, the data processing system may, in response to receiving the second execution request, start a second execution of the second application in the second runtime context. For example, the data processing system 1210 of FIG. 12 may start a second execution of the second application in RT context 1232.

During operation 1460, the data processing system may balance, with the server, a first load from the first execution with a second load from the second execution.

In some implementations, each one of the first and second runtime contexts is associated with a respective request queue. In these implementations, balancing, with the server, the first load from the first execution with the second load from the second execution may be based on the respective request queue length.

Illustratively, the data processing system may receive, with the server, a first remote direct memory access (RDMA) connection request for a first data exchange associated with the first execution request from the client and a second RDMA connection request for a second data exchange associated with the second execution request from the client.

In some scenarios, the pool of reconfigurable data flow resources may be configured to execute the first application in a third runtime context, and the server may receive a third execution request for executing the first application from the client. In these scenarios, the data processing system may, in response to receiving the third execution request start a third execution of the first application in the third runtime context and balance the first and second loads with a third load from the third execution. In other scenarios, the pool of reconfigurable data flow resources may be configured to execute the first application in a third runtime context, and the server may be coupled to an additional client in the client-server configuration. In these scenarios, the data processing system may, with the server, establish an additional session with the additional client and receive, with the server, a third execution request for executing the first application from the additional client. In response to receiving the third execution request, the data processing system may start a third execution of the first application in the third runtime context and balance the first and second loads with a third load from the third execution.

If desired, the data processing system may spawn, with the server, a first thread for handling the first execution request and spawn, with the server, a second thread that is different than the first thread for handling the second execution request. Alternatively, the data processing system may spawn, with the server, a single thread for handling the first and second execution requests.

In some implementations, each one of the first and second runtime contexts are associated with a respective request queue. In these implementations, the data processing system may access, with the server, the respective request queues in a round-robin manner.

If desired, a non-transitory computer-readable storage medium includes instructions that, when executed by a processing unit (e.g., host processor 902 of FIG. 9), cause the processing unit to operate a data processing system (e.g., the data processing system 900 of FIG. 9) by performing operation 1410 to 1460 of FIG. 14.

For example, a non-transitory computer-readable storage medium includes instructions that, when executed by a processing unit, cause the processing unit to operate a server in a client-server configuration, the server being part of a data processing system for executing first and second applications that a client in the client-server configuration, coupled to the server, can offload for execution onto the data processing system. The data processing system further comprises a pool of reconfigurable data flow resources that is coupled to the server and that is configured to execute the first application in a first runtime context and the second application in a second runtime context.

The instructions may include establishing a session with the client, receiving a first execution request for executing the first application from the client, receiving a second execution request for executing the second application from the client, in response to receiving the first execution request, starting a first execution of the first application in the first runtime context, in response to receiving the second execution request, starting a second execution of the second application in the second runtime context, and balancing a first load from the first execution with a second load from the second execution.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms. Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a data processing system in a client-server configuration for executing first and second applications that a client in the client-server configuration can offload for execution onto the data processing system, comprising: a pool of reconfigurable data flow resources that is configured to execute the first application in a first runtime context and the second application in a second runtime context; and a server in the client-server configuration that is coupled to the pool of reconfigurable data flow resources and to the client and that is configured to: establish a session with the client, receive a first execution request for executing the first application from the client, receive a second execution request for executing the second application from the client, in response to receiving the first execution request, start a first execution of the first application in the first runtime context, in response to receiving the second execution request, start a second execution of the second application in the second runtime context, and balance a first load from the first execution with a second load from the second execution.

In Example 2, each one of the first and second runtime contexts of Example 1 is associated with a respective request queue, and wherein the server is further configured to balance the first load from the first execution with the second load from the second execution based on the respective request queue length.

In Example 3, the pool of reconfigurable data flow resources of Example 1 comprises arrays of coarse-grained reconfigurable (CGR) units.

In Example 4, the pool of reconfigurable data flow resources of Example 3 is partitionable into a predetermined number of partitions, wherein each partition of the predetermined number of partitions comprises at least one array of coarse-grained reconfigurable units.

In Example 5, the data processing system of Example 1 further comprises a storage device that stores first and second configuration files that are associated with the first and second applications, wherein the first and second configuration files are used for configuring the pool of reconfigurable data flow resources so that the pool of reconfigurable data flow resources is configured to execute the first and second applications.

In Example 6, the data processing system of Example 5 further comprises a host processor that is coupled to the storage device and to the pool of reconfigurable data flow resources, and that is configured to: receive identifiers of the first and second applications, retrieve the first and second configuration files from the storage device using the identifiers of the first and second applications, and start the first and second runtime contexts using the first and second configuration files.

In Example 7, the server of Example 1 is coupled to at least one of a supercomputer, a mainframe computer, a workstation, a personal computer, or a quantum computer.

In Example 8, the server of Example 1 receives a first remote direct memory access (RDMA) connection request for a first data exchange associated with the first execution request from the client and a second RDMA connection request for a second data exchange associated with the second execution request from the client.

In Example 9, the pool of reconfigurable data flow resources of Example 1 is further configured to execute the first application in a third runtime context, wherein the server is further coupled to an additional client in the client-server configuration, and wherein the server is further configured to: establish an additional session with the additional client; receive a third execution request for executing the first application from the additional client; in response to receiving the third execution request, start a third execution of the first application in the third runtime context; and balance the first and second loads with a third load from the third execution.

In Example 10, the server of Example 1 is further configured to: spawn a first thread for handling the first execution request; and spawn a second thread that is different than the first thread for handling the second execution request.

In Example 11, the server of Example 1 is further configured to spawn a single thread for handling the first and second execution requests.

In Example 12, each one of the first and second runtime contexts of Example 11 is associated with a respective request queue, and wherein the server is further configured to access the respective request queues in a round-robin manner.

Example 13 is a method of operating a data processing system in a client-server configuration for executing first and second applications that a client in the client-server configuration can offload for execution onto the data processing system, the data processing system comprising a pool of reconfigurable data flow resources that is configured to execute the first application in a first runtime context and the second application in a second runtime context, and a server in the client-server configuration that is coupled to the pool of reconfigurable data flow resources and to the client, the method comprising: with the server, establishing a session with the client; receiving, with the server, a first execution request for executing the first application from the client; receiving, with the server, a second execution request for executing the second application from the client; in response to receiving the first execution request, starting a first execution of the first application in the first runtime context; in response to receiving the second execution request, starting a second execution of the second application in the second runtime context; and balancing, with the server, a first load from the first execution with a second load from the second execution.

In Example 14, each one of the first and second runtime contexts of Example 13 is associated with a respective request queue, and wherein balancing, with the server, the first load from the first execution with the second load from the second execution is based on the respective request queue length.

In Example 15, the method of Example 13 further comprises receiving, with the server, a first remote direct memory access (RDMA) connection request for a first data exchange associated with the first execution request from the client and a second RDMA connection request for a second data exchange associated with the second execution request from the client.

In Example 16, the pool of reconfigurable data flow resources of Example 13 is further configured to execute the first application in a third runtime context, and wherein the server is further coupled to an additional client in the client-server configuration, the method further comprising: with the server, establishing an additional session with the additional client; receiving, with the server, a third execution request for executing the first application from the additional client; in response to receiving the third execution request, starting a third execution of the first application in the third runtime context; and balancing the first and second loads with a third load from the third execution.

In Example 17, the method of Example 13, further comprises spawning, with the server, a first thread for handling the first execution request; and spawning, with the server, a second thread that is different than the first thread for handling the second execution request.

In Example 18, the method of Example 13, further comprises spawning, with the server, a single thread for handling the first and second execution requests.

In Example 19, each one of the first and second runtime contexts of Example 18 are associated with a respective request queue, the method further comprising: accessing, with the server, the respective request queues in a round-robin manner.

Example 20 is a non-transitory computer-readable storage medium including instructions that, when executed by a processing unit, cause the processing unit to operate a server in a client-server configuration, the server being part of a data processing system for executing first and second applications that a client in the client-server configuration, coupled to the server, can offload for execution onto the data processing system, the data processing system further comprising a pool of reconfigurable data flow resources that coupled to the server and that is configured to execute the first application in a first runtime context and the second application in a second runtime context, the instructions comprising: establishing a session with the client; receiving a first execution request for executing the first application from the client; receiving a second execution request for executing the second application from the client; in response to receiving the first execution request, starting a first execution of the first application in the first runtime context; in response to receiving the second execution request, starting a second execution of the second application in the second runtime context; and balancing a first load from the first execution with a second load from the second execution.

What is claimed is:

1. A data processing system in a client-server configuration for executing first and second applications that a client in the client-server configuration can offload for execution onto the data processing system, comprising:
a pool of reconfigurable data flow resources that comprises arrays of coarse-grained reconfigurable (CGR) units and that is configured to execute the first application in a first runtime context and the second application in a second runtime context, wherein the pool of reconfigurable data flow resources is partitionable into a predetermined number of partitions, wherein each partition of the predetermined number of partitions comprises at least one array of coarse-grained reconfigurable units; and
a server in the client-server configuration that comprises a storage device and a host processor that is coupled to the storage device and to the pool of reconfigurable data flow resources, wherein the server is coupled to the client and configured to:
establish a session with the client,
receive a first execution request for executing the first application from the client,
receive a second execution request for executing the second application from the client,
in response to receiving the first execution request, start a first execution of the first application in the first runtime context,
in response to receiving the second execution request, start a second execution of the second application in the second runtime context, and
balance a first load from the first execution with a second load from the second execution.

2. The data processing system of claim 1, wherein each one of the first and second runtime contexts is associated with a respective request queue length, and wherein the server is further configured to balance the first load from the first execution with the second load from the second execution based on the respective request queue length.

3. The data processing system of claim 1, wherein the storage device stores first and second configuration files that are associated with the first and second applications, wherein the first and second configuration files are used for configuring the pool of reconfigurable data flow resources so that the pool of reconfigurable data flow resources is configured to execute the first and second applications.

4. The data processing system of claim 3, wherein the host processor is configured to:
receive identifiers of the first and second applications,
retrieve the first and second configuration files from the storage device using the identifiers of the first and second applications, and
start the first and second runtime contexts using the first and second configuration files.

5. The data processing system of claim 1, wherein the server is coupled to at least one of a supercomputer, a mainframe computer, a workstation, a personal computer, or a quantum computer.

6. The data processing system of claim 1, wherein the server receives a first remote direct memory access (RDMA) connection request for a first data exchange associated with the first execution request from the client and a second RDMA connection request for a second data exchange associated with the second execution request from the client.

7. The data processing system of claim 1, wherein the pool of reconfigurable data flow resources is further configured to execute the first application in a third runtime context, wherein the server is further coupled to an additional client in the client-server configuration, and wherein the server is further configured to:
establish an additional session with the additional client;
receive a third execution request for executing the first application from the additional client;
in response to receiving the third execution request, start a third execution of the first application in the third runtime context; and
balance the first and second loads with a third load from the third execution.

8. The data processing system of claim 1, wherein the server is further configured to:
spawn a first thread for handling the first execution request; and
spawn a second thread that is different than the first thread for handling the second execution request.

9. The data processing system of claim 1, wherein the server is further configured to:
spawn a single thread for handling the first and second execution requests.

10. The data processing system of claim 9, wherein each one of the first and second runtime contexts is associated with a respective request queue, and wherein the server is further configured to access the respective request queues in a round-robin manner.

11. A method of operating a data processing system in a client-server configuration for executing first and second applications that a client in the client-server configuration can offload for execution onto the data processing system, the data processing system comprising a pool of reconfigurable data flow resources that comprises arrays of coarse-grained reconfigurable (CGR) units, that is partitionable into a predetermined number of partitions, wherein each partition of the predetermined number of partitions comprises at least one array of coarse-grained reconfigurable units, and that is configured to execute the first application in a first runtime context and the second application in a second runtime context, and a server in the client-server configuration that comprises a storage device and a host processor that is coupled to the storage device and to the pool of reconfigurable data flow resources, wherein the server is coupled to the client, the method comprising:

with the server, establishing a session with the client;
receiving, with the server, a first execution request for executing the first application from the client;
receiving, with the server, a second execution request for executing the second application from the client;
in response to receiving the first execution request, starting a first execution of the first application in the first runtime context;
in response to receiving the second execution request, starting a second execution of the second application in the second runtime context; and
balancing, with the server, a first load from the first execution with a second load from the second execution.

12. The method of claim 11, wherein each one of the first and second runtime contexts is associated with a respective request queue length, and wherein balancing, with the server, the first load from the first execution with the second load from the second execution is based on the respective request queue length.

13. The method of claim 11, further comprising:
receiving, with the server, a first remote direct memory access (RDMA) connection request for a first data exchange associated with the first execution request from the client and a second RDMA connection request for a second data exchange associated with the second execution request from the client.

14. The method of claim 11, wherein the pool of reconfigurable data flow resources is further configured to execute the first application in a third runtime context, and wherein the server is further coupled to an additional client in the client-server configuration, the method further comprising:
with the server, establishing an additional session with the additional client;
receiving, with the server, a third execution request for executing the first application from the additional client;
in response to receiving the third execution request, starting a third execution of the first application in the third runtime context; and balancing the first and second loads with a third load from the third execution.

15. The method of claim 11, further comprising:
spawning, with the server, a first thread for handling the first execution request; and
spawning, with the server, a second thread that is different than the first thread for handling the second execution request.

16. The method of claim 11, further comprising:
spawning, with the server, a single thread for handling the first and second execution requests.

17. The method of claim 16, wherein each one of the first and second runtime contexts are associated with a respective request queue, the method further comprising:
accessing, with the server, the respective request queues in a round-robin manner.

18. A non-transitory computer-readable storage medium including instructions that, when executed by a processing unit, cause the processing unit to operate a server in a client-server configuration, the server being part of a data processing system for executing first and second applications that a client in the client-server configuration, coupled to the server, can offload for execution onto the data processing system, the data processing system further comprising a pool of reconfigurable data flow resources coupled to the server that comprises arrays of coarse-grained reconfigurable (CGR) units, that is partitionable into a predetermined number of partitions, wherein each partition of the predetermined number of partitions comprises at least one array of coarse-grained reconfigurable units, and that is configured to execute the first application in a first runtime context and the second application in a second runtime context, the instructions comprising:

establishing a session with the client;
receiving a first execution request for executing the first application from the client;
receiving a second execution request for executing the second application from the client;
in response to receiving the first execution request, starting a first execution of the first application in the first runtime context;
in response to receiving the second execution request, starting a second execution of the second application in the second runtime context; and
balancing a first load from the first execution with a second load from the second execution.

* * * * *